United States Patent
Kalvaitis et al.

(10) Patent No.: US 12,231,504 B1
(45) Date of Patent: Feb. 18, 2025

(54) SYSTEM AND METHOD FOR REESTABLISHING VPN CONNECTIONS

(71) Applicant: UAB 360 IT, Vilnius (LT)

(72) Inventors: Evaldas Kalvaitis, Vilnius (LT); Ignas Vienažindys, Vilnius (LT); Paulius Martišius, Vilnius (LT)

(73) Assignee: UAB 360 IT, Vilnius (LT)

( * ) Notice: Subject to any disclaimer, the term of this patent is extended or adjusted under 35 U.S.C. 154(b) by 0 days.

(21) Appl. No.: 18/584,549

(22) Filed: Feb. 22, 2024

(51) Int. Cl.
*H04L 12/00* (2006.01)
*H04L 9/40* (2022.01)
*H04L 67/14* (2022.01)

(52) U.S. Cl.
CPC .......... *H04L 67/14* (2013.01); *H04L 63/0272* (2013.01)

(58) Field of Classification Search
CPC ................. H04L 12/4633; H04L 67/14; H04L 63/0272; H04L 63/164
USPC ......................................................... 709/227
See application file for complete search history.

(56) References Cited

U.S. PATENT DOCUMENTS

| | | | | |
|---|---|---|---|---|
| 6,671,729 B1 * | 12/2003 | Gordon | ............... | H04L 63/0272 709/227 |
| 8,085,702 B2 * | 12/2011 | Babin | ..................... | H04L 69/28 455/434 |
| 8,132,247 B2 * | 3/2012 | Adhya | ..................... | H04L 69/40 713/153 |
| 8,914,845 B2 * | 12/2014 | Barton | ................ | H04W 12/086 726/4 |
| 9,009,327 B2 * | 4/2015 | Adhya | ................ | H04L 61/5007 709/227 |
| 9,521,117 B2 * | 12/2016 | Barton | ................ | H04L 63/0807 |
| 11,190,491 B1 * | 11/2021 | Kaciulis | ................ | H04L 63/029 |
| 11,223,776 B1 * | 1/2022 | Lachman | ............. | H04N 23/633 |
| 11,558,469 B1 * | 1/2023 | Neznanovas | ......... | H04L 67/141 |
| 11,683,293 B2 * | 6/2023 | Narula | ................ | H04L 61/5007 726/15 |
| 2004/0225895 A1 * | 11/2004 | Mukherjee | ............ | H04L 63/164 726/15 |
| 2009/0122990 A1 * | 5/2009 | Gundavelli | ........... | H04L 63/164 380/278 |
| 2013/0318345 A1 * | 11/2013 | Hengeveld | .............. | H04L 45/22 713/168 |
| 2015/0135303 A1 * | 5/2015 | Makavy | .............. | H04W 12/102 726/15 |

FOREIGN PATENT DOCUMENTS

EP           3185488 A1 *   6/2017   ......... H04L 12/4633

* cited by examiner

*Primary Examiner* — Frantz Coby
(74) *Attorney, Agent, or Firm* — Meunier Carlin & Curfman LLC

(57) ABSTRACT

Disclosed herein are an exemplary system and method for recurring VPN connections. The exemplary system and method are used for detecting the situations in which a user device is not able to establish VPN, detecting the situations in which the user device with active VPN connections is/are not able to reach resources on a network. The exemplary system and method also provide user device protected data transmission without data leakage during attempts at recurring VPN connections. The exemplary system and method include retry flow strategies, along with in-application enabled user decisions, and user-specific dataset flows.

18 Claims, 14 Drawing Sheets

SYSTEM AND METHOD FOR REESTABLISHING VPN CONNECTIONS

TECHNICAL FIELD

This disclosure generally relates to protocols for reconnecting to a VPN and privacy protection.

BACKGROUND

Resolving network issues in networking applications involves implementing various strategies and techniques to ensure a smooth user experience even in challenging network conditions. These approaches may include connection retry mechanisms, connection resilience, caching, offline support, optimized data transfer, adaptive streaming, error handling and user feedback, as well as analytics and monitoring. Because different applications are facing different problems, their solutions to network instability or loss issues (e.g., no net situations) may differ.

VPN (Virtual Private Network) applications are designed to provide secure and private network connections, even in challenging network conditions. To ensure a smooth connection, there are several methods that may be used by VPN applications.

SUMMARY

An exemplary system and method are disclosed for recurring VPN connections. The exemplary system and method are used for detecting the situations in which a user device is not able to re-establish a VPN connection (e.g. user device connection status related no network detection or related to no VPN connection), detecting the situations in which the user device with active VPN connections is/are not able to reach resources on the internet or when the user device is not able to access a VPN server. The exemplary system and method also provide the user device with protected data transmission without data leakage during attempts at recurring VPN connections.

The exemplary system and method incorporate simple and intelligent protocols, along with in-application enabled user decisions, to optimize resource utilization and self-activation when network connection is monitored and lost. This solution ensures efficient deployment, streamlining the integration process for the user experience. Users may rely on a robust and secure VPN environment, free from data vulnerability, while being able to focus on their tasks without network connectivity concerns.

In some aspects, the techniques described herein relate to a method for re-establishing a VPN connection of a user device, the method including: determining a user device's network connection; determining whether the user device is able to connect to a VPN server; wherein in response to the determination that the user device is able to connect to a VPN server: establishing a connection to the network with the VPN server; creating a user-specific dataset on a VPN application; duplicating the user-specific dataset; transferring the duplicated user-specific dataset to a client side library; and enabling the duplicated user-specific dataset on the VPN application and the client side library.

In some aspects, the techniques described herein relate to a method, wherein in response to the determination that the user device is not able to connect to a VPN server, the method further including: sending a user interface (UI) message for a user to connect to a network without VPN; attempting to connect to a network without VPN; and determining if the user device is able to connect to the network without VPN; wherein in response to the determination: sending a UI message including the determination and a recommendation for the user to change a network connectivity setting; enabling the user-specific dataset on the VPN application; stopping the VPN connection on the client side library; disabling the duplicate user-specific dataset on the client side library; and disabling all library processes on the client side library.

In some aspects, the techniques described herein relate to a method, wherein in response to the determination that the user device is not able to connect to a VPN server, the method further including: attempting to connect to each of a plurality of VPN servers by rotating through the plurality of VPN servers; and determining, by the VPN application, whether the user device is able to connect to a VPN server; wherein in response to the determination that the user device is able to connect to a VPN server: establishing a connection to the network using a VPN server; duplicating the user-specific dataset on the VPN application for a second time; transferring the second duplicated user-specific dataset to a client side library; and enabling the second duplicated user-specific dataset on the VPN application and the client side library.

In some aspects, the techniques described herein relate to a method, wherein in response to the determination that the user device is not able to connect to a VPN server, the method further including: sending a UI message for a user to connect to a network without VPN; attempting to connect to a network without VPN; and determining if the user device is able to connect to the network without VPN; wherein in response to the determination: sending a UI message including the determination and a recommendation for the user to change a network connectivity setting; enabling the user-specific dataset on the VPN application; stopping the VPN connection on the client side library; disabling the duplicate user-specific dataset on the client side library; and disabling all library processes on the client side library.

In some aspects, the techniques described herein relate to a method, wherein in response to the determination that the user device is not able to connect to a VPN server, the method further including: checking a status of VPN features and enabling a plurality of VPN features, wherein the plurality of VPN features includes a first VPN feature; disabling the first VPN feature; attempting to connect to each of a plurality of VPN servers by rotating through the plurality of VPN servers; and determining, by the VPN application, whether the user device is able to connect to a VPN server; wherein in response to the determination that the user device is able to connect to the VPN server: establishing a connection to the network using the VPN server; duplicating the user-specific dataset on the VPN application for a second time; transferring the second duplicated user-specific dataset to a client side library; and enabling the second duplicated user-specific dataset on the VPN application and the client side library.

In some aspects, the techniques described herein relate to a method, wherein in response to the determination that the user device is not able to connect to the VPN server, the method further including: disabling each of the plurality of VPN features in turn; rotating through a plurality of VPN protocols; attempting to connect to the VPN server; and determining, by the VPN application, whether the user device is able to connect to the VPN server; wherein in response to the determination that the user device is able to connect to the VPN server: establishing a connection to the network using the VPN server; duplicating the user-specific dataset on the VPN application for a second time; transferring the second duplicated user-specific dataset to a client side library; and enabling the second duplicated user-specific dataset on the VPN application and the client side library.

In some aspects, the techniques described herein relate to a method, wherein in response to the determination that the user device is not able to connect to the VPN server, the method further including: sending a user interface message for a user to try to connect to a network without VPN; attempting, by the VPN application, to connect to a network without VPN; and determining if the user device is able to connect to the network without VPN; wherein in response to the determination: sending a UI message including the determination and a recommendation for the user to change a network connectivity setting; enabling the user-specific dataset on the VPN application; stopping the VPN connection on the client side library; disabling the duplicate user-specific dataset on the client side library; and disabling all library processes on the client side library.

In some aspects, the techniques described herein relate to a method, wherein in response to the determination that the user device is not able to connect to a VPN server, the method further including: checking a status of VPN features and enabling a plurality of VPN features; disabling each of the plurality of VPN features in turn; rotating through a plurality of VPN protocols; attempting to connect to the VPN server; and determining whether the user device is able to connect to a VPN server; wherein in response to the determination that the user device is able to connect to a VPN server: establishing a connection to the network using the VPN server; duplicating the user-specific dataset on the VPN application for a second time; transferring the second duplicated user-specific dataset to a client side library; and enabling the second duplicated user-specific dataset on the VPN application and the client side library.

In some aspects, the techniques described herein relate to a method, wherein in response to the determination that the user device is not able to connect to a VPN server, the method further including: sending a user interface message for a user to connect to a network without VPN; attempting to connect to a network without VPN; and determining if the user device is able to connect to the network without VPN; wherein in response to the determination: sending a UI message including the determination and a recommendation for the user to change a network connectivity setting; enabling the user-specific dataset on the VPN application; stopping the VPN connection on the client side library; disabling the duplicate user-specific dataset on the client side library; and disabling all library processes on the client side library.

In some aspects, the techniques described herein relate to a method further including: receiving a user request to terminate the VPN connection; terminating the VPN connection; disabling the user-specific dataset at the VPN application; stopping the VPN connection on the client side library; disabling the duplicated user-specific dataset at the client side library; and disabling all library processes on the client side library.

In some aspects, the techniques described herein relate to a system for re-establishing a VPN connection, the system including a user device including: a processor; a communications interface, wherein the communication interface is in communication with a network and the network communicates with a plurality of VPN servers; a non-transitory computer readable medium with computer-executable instructions stored thereon that when executed by the processor, cause the system to: check the user device's network connection; and determine whether the user device is able to connect to a VPN server; wherein in response to the determination that the user device is able to connect to a VPN server: establish a connection to the network using the VPN server; create a user-specific dataset on a VPN application; duplicate the user-specific dataset; transfer the duplicated user-specific dataset to a client side library; and enable the duplicated user-specific dataset on the VPN application and the client side library.

In some aspects, the techniques described herein relate to a system, further including computer-executable instructions that when executed by the processor cause the system to: wherein in response to the determination that the user device is not able to connect to a VPN server: send a UI message for a user to connect to a network without VPN; attempt, by the VPN application, to connect to a network without VPN; and determine if the user device is able to connect to the network without VPN; wherein in response to the determination, send a UI message including the determination and a recommendation for the user to change a network connectivity setting.

In some aspects, the techniques described herein relate to a system, further including computer-executable instructions that when executed by the processor cause the system to: wherein in response to the determination that the user device is not able to connect to a VPN server: attempt to connect to each of a plurality of VPN servers by rotating through the plurality of VPN servers; and determine whether the user device is able to connect to a VPN server; wherein in response to the determination that the user device is able to connect to a VPN server: establish a connection to the network using the VPN server; duplicate the user-specific dataset on the VPN application for a second time; transfer the second duplicated user-specific dataset to a client side library; and enable the second duplicated user-specific dataset on the VPN application and the client side library.

In some aspects, the techniques described herein relate to a system, further including computer-executable instructions that when executed by the processor cause the system to: wherein in response to the determination that the user device is not able to connect to a VPN server: send a UI message for a user to connect to a network without VPN; attempt to connect to a network without VPN; and determine if the user device is able to connect to the network without VPN; wherein in response to the determination: send a UI message including the determination and a recommendation for the user to change a network connectivity setting; enable the user-specific dataset on the VPN application; stop the VPN connection on the client side library; disable the duplicate user-specific dataset on the client side library; and disable all library processes on the client side library.

In some aspects, the techniques described herein relate to a system, further including computer-executable instructions that when executed by the processor cause the system to: wherein in response to the determination that the user device is not able to connect to a VPN server: check a status of VPN features and enabling a plurality of VPN features, wherein the plurality of VPN features includes a first VPN feature; disable the first VPN feature; attempt to connect to each of a plurality of VPN servers by rotating through the plurality of VPN servers; and determine, by the VPN application, whether the user device is able to connect to a VPN server; wherein in response to the determination that the user device is able to connect to the VPN server: establish a connection to the network using the VPN server; duplicate the user-specific dataset on the VPN application for a second time; transfer the second duplicated user-specific dataset to a client side library; and enable the second duplicated user-specific dataset on the VPN application and the client side library.

In some aspects, the techniques described herein relate to a system, further including computer-executable instructions that when executed by the processor cause the system to: wherein in response to the determination that the user device is not able to connect to the VPN server: disable each of the plurality of VPN features; rotate through a plurality of VPN protocols; attempt to connect to the VPN server; and determine, by the VPN application, whether the user device is able to connect to the VPN server; wherein in response to the determination that the user device is able to connect to the VPN server: establish a connection to the network using the VPN server; duplicate the user-specific dataset on the VPN application for a second time; transfer the second duplicated user-specific dataset to a client side library; and enable the second duplicated user-specific dataset on the VPN application and the client side library.

In some aspects, the techniques described herein relate to a system, further including computer-executable instructions that when executed by the processor cause the system to: wherein in response to the determination that the user device is not able to connect to the VPN server: send a UI message for a user to try to connect to a network without VPN; attempt to connect to a network without VPN; and determine if the user device is able to connect to the network without VPN; wherein in response to the determination: send a UI message including the determination and a recommendation for the user to change a network connectivity setting. enable the user-specific dataset on the VPN application; stop the VPN connection on the client side library; disable the duplicate user-specific dataset on the client side library; and disable all library processes on the client side library.

In some aspects, the techniques described herein relate to a system, further including computer-executable instructions that when executed by the processor cause the system to: wherein in response to the determination that the user device is not able to connect to a VPN server: check a status of VPN features and enabling a plurality of VPN features: disable each of the plurality of VPN features in turn; rotate through a plurality of VPN protocols; attempt to connect to the VPN server; and determine whether the user device is able to connect to a VPN server; wherein in response to the determination that the user device is able to connect to a VPN server: establish a connection to the network using the VPN server; duplicate the user-specific dataset on the VPN application for a second time; transfer the second duplicated user-specific dataset to a client side library; and enable the second duplicated user-specific dataset on the VPN application and the client side library.

In some aspects, the techniques described herein relate to a system, further including computer-executable instructions that when executed by the processor cause the system to: wherein in response to the determination that the user device is not able to connect to the VPN server: send a UI message for a user to try to connect to a network without VPN; attempt to connect to a network without VPN; and determine if the user device is able to connect to the network without VPN; wherein in response to the determination: send a UI message including the determination and a recommendation for the user to change a network connectivity setting. enable the user-specific dataset on the VPN application; stop the VPN connection on the client side library; disable the duplicate user-specific dataset on the client side library; and disable all library processes on the client side library.

In some aspects, the techniques described herein relate to a system, further including computer-executable instructions that when executed by the processor cause the system to: receive a user request to terminate the VPN connection: terminate the VPN connection; disable the user-specific dataset at the VPN application; stop the VPN connection on the client side library; disable the duplicated user-specific dataset at the client side library; and disable all library processes on the client side library.

BRIEF DESCRIPTION OF THE DRAWINGS

The accompanying drawings, which are incorporated in and constitute a part of this specification, illustrate embodiments and, together with the description, serve to explain the principles of the methods and systems.

DETAILED SPECIFICATION

Figure 1A:
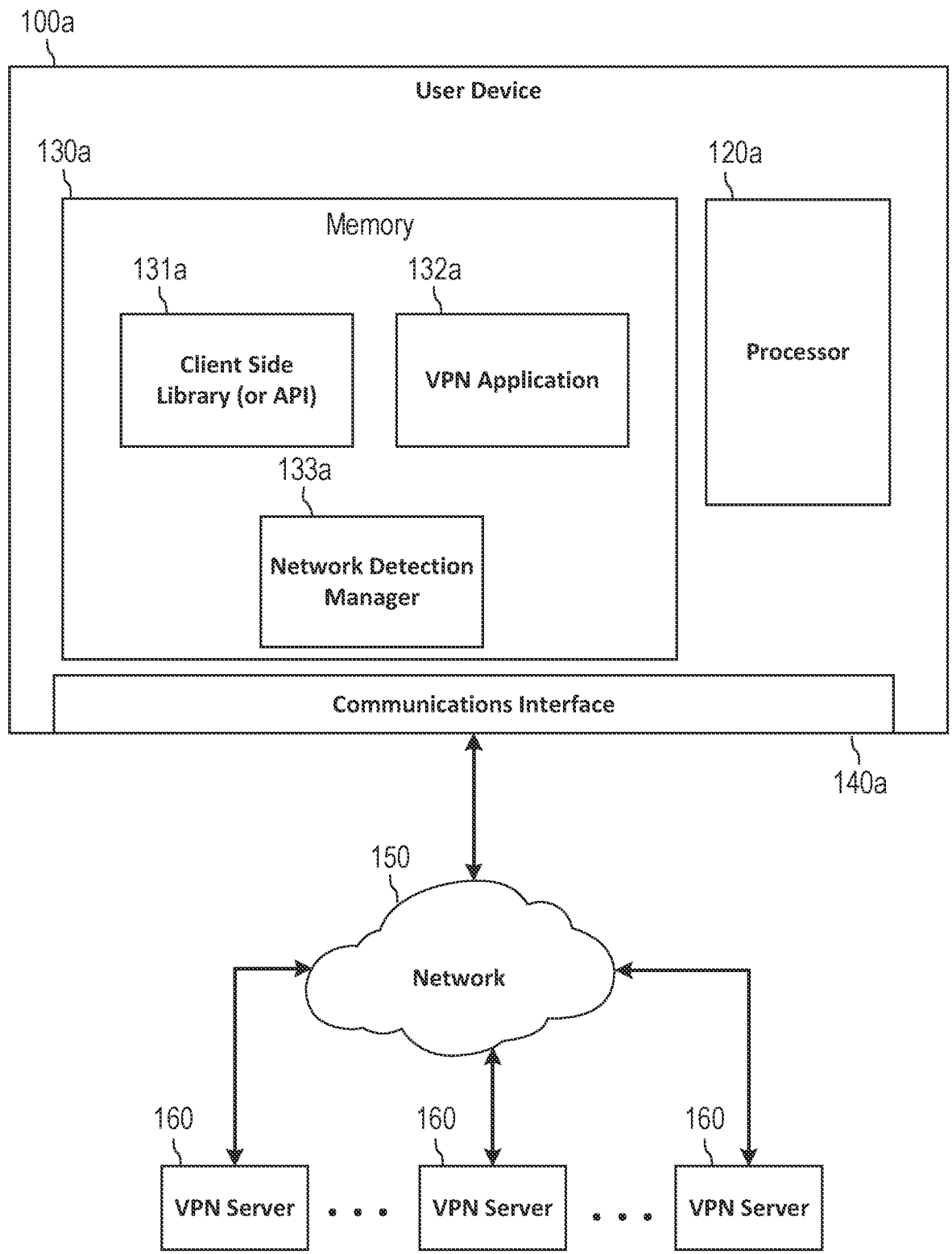
FIGS. 1A-1B show exemplary computing system architectures.

VPN applications frequently integrate automatic reconnection mechanisms to handle network connection instability or loss, providing a secure and uninterrupted user experience (i.e., constant monitoring for the available VPN servers and their connection parameters to automatically reconnect the VPN user to the VPN server with the best connection parameters). However, it is important to note some potential disadvantages. Automatic reconnection, while convenient, can raise privacy concerns as data may be exposed during the brief disconnection period. Furthermore, switching server locations within VPN applications can introduce temporary disruptions and delays during the reconnection process and may not be appreciated by VPN service users.

Similarly, VPN server switching ensures a reliable connection by employing multiple servers in different locations, preventing overloads and downtime. However, it may cause occasional speed fluctuations and disconnections during server handoffs. To mitigate potential challenges, it is advisable to opt for reputable VPN service providers, take into account VPN server proximity, and leverage the advantages of optimized routing and secure network connection.

VPN feature toggles provide customization options for users to optimize performance, security, and privacy based on their needs. However, caution is needed as misconfigurations can compromise security, and clear guidelines from VPN providers are essential for a smooth VPN connection.

Moreover, VPN applications support various VPN protocols, each with different reliability and performance levels. While the VPN applications can automatically switch between VPN protocols to ensure a stable connection, this may result in momentary interruptions or slower performance during the transition. Additionally, intelligent routing techniques employed by some VPN applications require constant analysis, which can consume system resources and introduce latency.

While VPN connection resilience mechanisms, like connection pooling and employing keep-alive packets, help maintain stability in the presence of network disruptions, they may utilize additional bandwidth and introduce delays in establishing connections. Split tunneling, another useful VPN feature, allows users to choose which traffic should go through the VPN. However, it can pose security risks by exposing non-sensitive activities directly to the internet.

Network diagnostic tools in VPN applications can assist in troubleshooting network issues, but they may require additional permissions or access to personal data, necessitating caution to protect privacy and security.

It's important to note that the effectiveness of these approaches may vary depending on the VPN provider and its specific implementation. Different VPN providers may employ additional proprietary techniques or optimizations to address network issues and enhance the user experience.

In certain scenarios, such as when switching between different networks or when the user experiences delays in regaining internet access after changing Wi-Fi connections or others, VPN users may encounter network connectivity issues without being fully aware of the underlying problems or their causes. Consequently, they might disconnect from the VPN and cease using its functionality altogether. It is noteworthy that these issues are pervasive across different operating systems. The reasons for a user device being unable to establish a VPN connection can typically be attributed to two main scenarios: firstly, the user is unable to establish the VPN connection despite repeated attempts by the VPN application to establish the tunnel; and secondly, the user device is successfully connected, but the request fails to reach the target server, preventing access to internet resources. Detecting and resolving these issues often necessitates a substantial investment of time and resources, while the failure to address them in a timely manner can potentially result in data leakage.

An exemplary system and method are disclosed for recurring VPN connections. The exemplary system and method are used for detecting the situations in which a user device is not able to establish a VPN connection, for example, when a user device is not able to access any internet resources including when a user device has an active VPN connection or when a user device is also not able to access a VPN server. The exemplary system and method also provide user device protected data transmission without data leakage during attempts at recurring VPN connections.

The exemplary system and method incorporate simple and intelligent protocols, along with in-application-enabled user decisions to optimize resource utilization and self-activation when network connection is monitored and lost. This solution ensures efficient deployment, streamlining the integration process for the user experience. Users may rely on a robust and secure VPN environment, free from data vulnerability, while being able to focus on their tasks without network connectivity concerns.

Figure 1B:
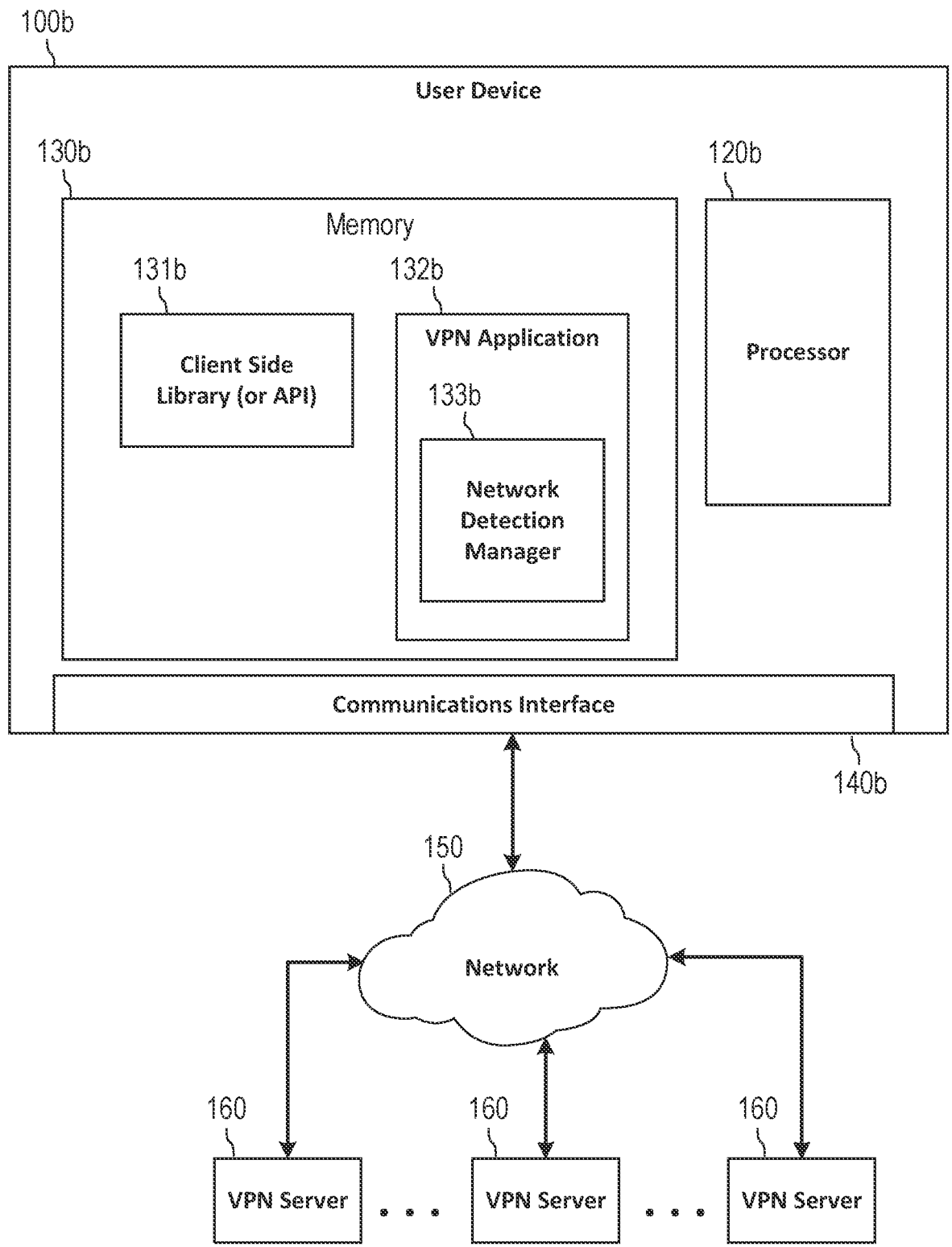

An exemplary system is shown in FIGS. 1A and 1B, which includes a user device 100a, 100b having a memory storage 130a, 130b with instructions stored thereon that are executed by a processor 120a, 120b, and a communications interface 140a, 140b communicatively connected to a network, the network 150 being connected to a plurality of VPN servers 160. In some aspects, the memory 130a includes a client side library 131a, which may act as an API, a VPN application 132a, and a network detection manager 133a. The client side library 131a which may act as an API, the VPN application 132a, and the network detection manager 133a may rely on one or more instructions from the other modules. In another aspect, the memory 130b includes a client side library 131b, which may act as an API, a VPN application 132b, and a network detection manager 133b, the network detection manager 133b being part of the VPN application 132b.

In some aspects, it is contemplated that the plurality of VPN servers 160 may be part of a VPN service or VPN service infrastructure such that the VPN service or VPN service infrastructure is communicatively connected to the user device 100a, 100b, through the network 150.

Figure 2:
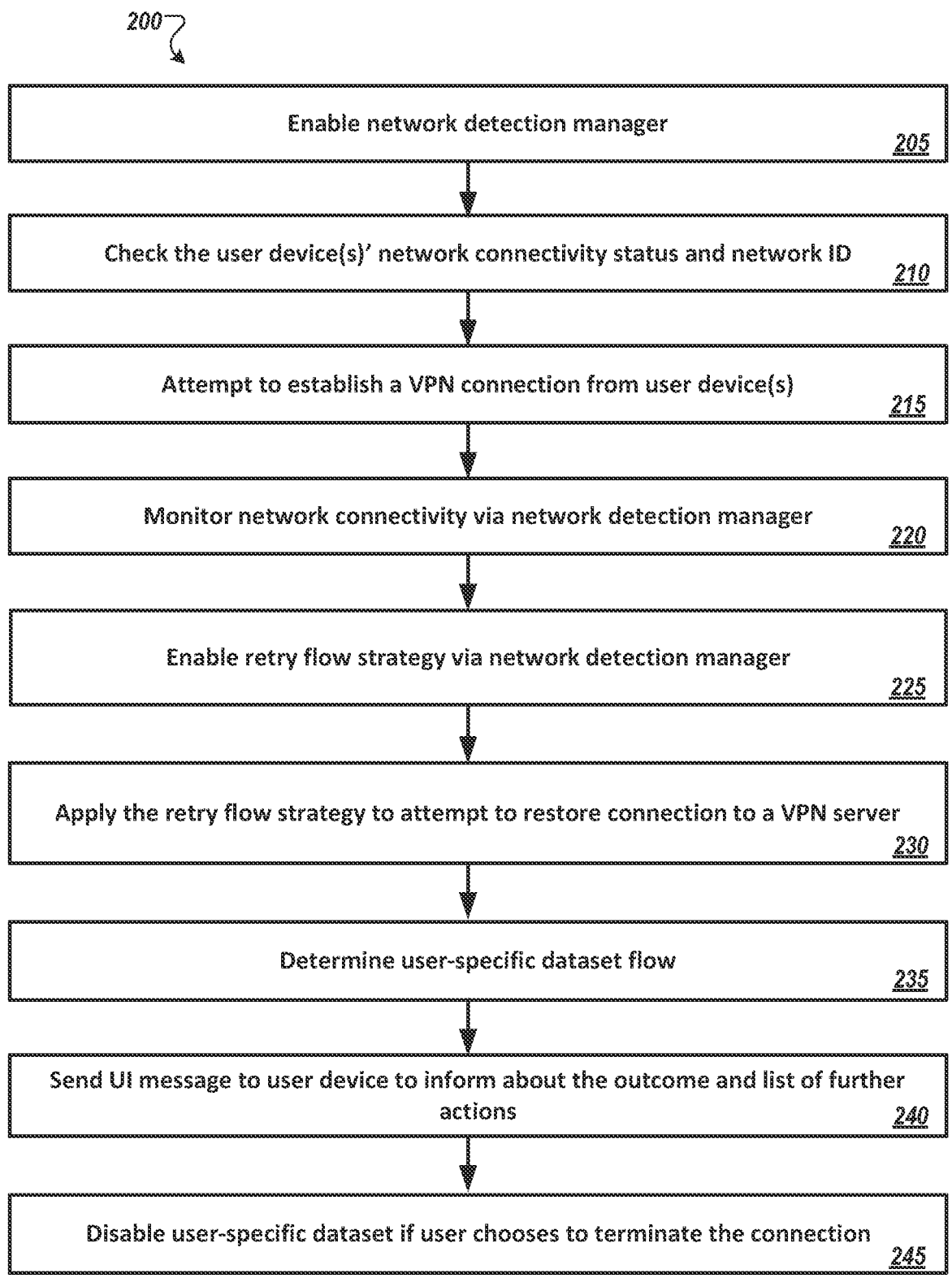
FIG. 2 shows a schematic of an exemplary method.

An exemplary method for an application to reconnect to a VPN service is shown in FIG. 2. The method 200 includes enabling a network detection manager 205, checking a user device's network connectivity status and network identification (ID) 210 by querying external resources, attempting to establish a VPN connection from the user device 215, monitoring network connectivity via the network detection manager 220, and enabling a retry flow strategy by the network detection manager 225. For example, if the user device is connected to the network and the application cannot connect to a VPN server, a retry flow strategy is enabled 225. In another example, a retry flow strategy is enabled if the user has an internet connection before connecting to the VPN, and after connecting to the VPN loses the internet connection as determined by the network detection manager. The method further includes applying the retry flow strategy to attempt to restore the connection to a VPN server 230, determining user-specific dataset flow 235, informing the user about the outcome via a UI message with a list of further actions 240. The action list may be to continue retry flow strategies or to terminate the connection. If the user chooses to terminate the connection, the user-specific dataset is disabled 245. The retry flow strategies are one or both of server rotation strategy or protocol/feature rotation strategy, examples of which are presented herewith. The retry flow strategy is applied to attempt to restore connection to a VPN server 230. Depending on the outcome after the retry flow strategy, further flows related to user-specific dataset are applied 235. The user is informed about the outcome (e.g. current connection status, etc.) via UI message 240.

To monitor the network connectivity, the network detection manager (i.e. using a low-level library or using a network detection manager included in the VPN application) performs constant network connection checks 220. The network detection manager is utilized at least in part to check the connection to the network. The network detection manager employs additional steps to verify and establish the availability of the connection. Initially, the network detection manager assesses the viability of the previously established tunnel. For example, the network detection manager may use different resources to check if the user device has a network connection by pinging DNS servers, to see if the server is reachable, sending DNS requests, to see if the domain name is resolved with the IP address correctly, pinging the VPN infrastructure API, to see if the user device can reach VPN services and communication could be established. Subsequently, a keepalive message is transmitted to a designated node. If the node remains unresponsive, the network detection manager utilizes a predetermined timeout before retransmitting the keepalive message to the same node, ensuring message delivery in case of previous connection loss. If a response is not received, the network detection manager proceeds by sending a ping. Dependently, the network detection manager might employ different types of ping requests, such as ICMP echo, one-way UDP message, or L2 tunneling protocol. The network detection manager waits for a response within a predefined time frame. If no response is received by the network detection manager, another ping signal is sent. If the node continues to remain unresponsive after a specified duration of time, the connection is considered to be in a "dead" state. The external resources (e.g., the operating system (OS)) are pinged to provide an indication about the connectivity status. The VPN infrastructure is pinged if a network detection manager, the external resource (e.g., OS) or both indicates that the network connectivity status is active but the VPN application itself cannot detect the connection.

Figure 7:
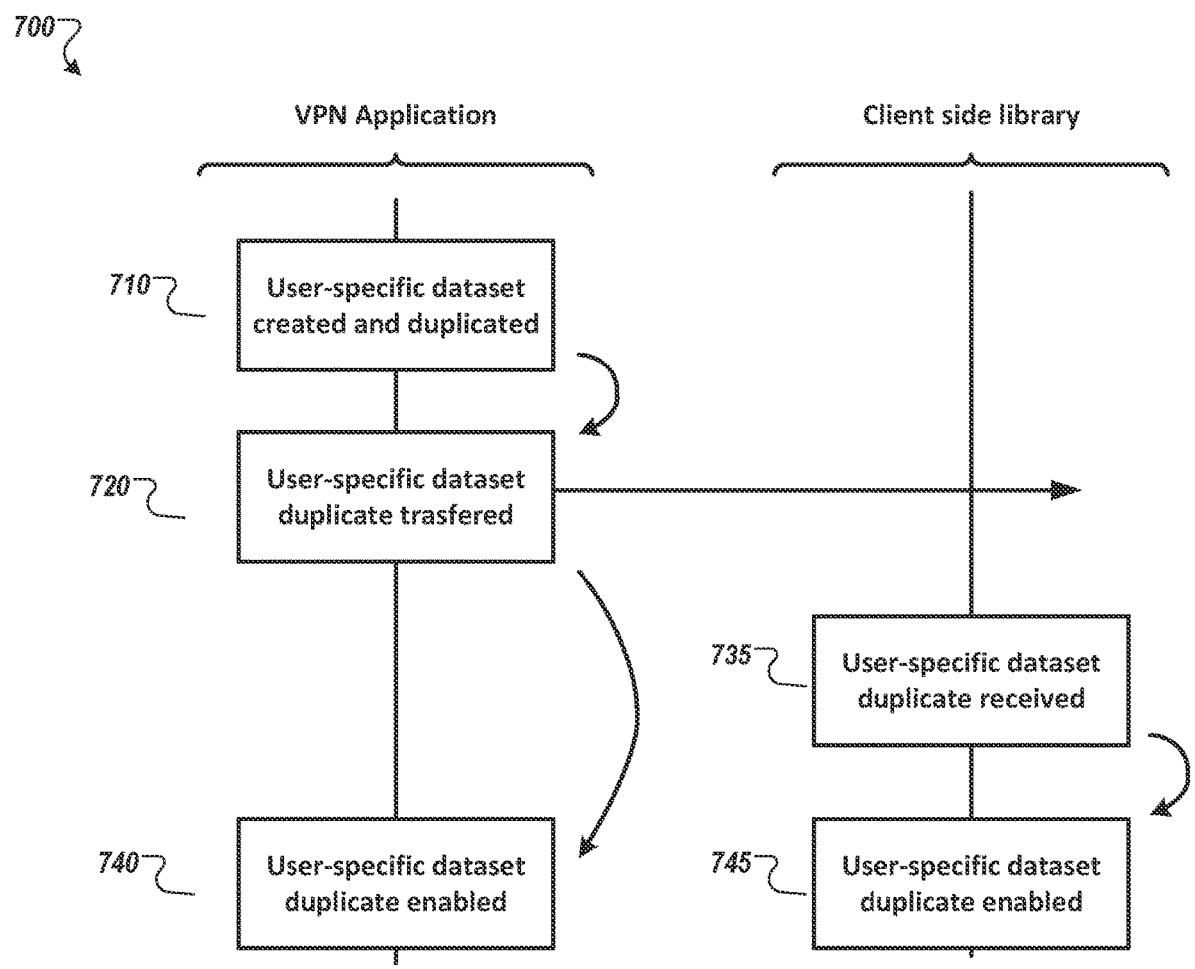
FIG. 7 shows a user-specific dataset flow on re-establishing a VPN connection.

As part of an exemplary method, a user-specific dataset flow is enabled, which prevents data leakage during the attempts to recurrently connect to a VPN server. Upon a successful VPN connection establishment (per FIG. 7), the VPN application creates a user-specific dataset containing connection parameters (e.g. VPN interface address, DNS addresses, IP routing rules, etc.), and duplicates the user-specific dataset 710 on the VPN application. The duplicate dataset is transferred 720 to the client side library 735, then both datasets (original and duplicate) are enabled simultaneously on the VPN application 740 and on the client side library 745.

Figure 8:
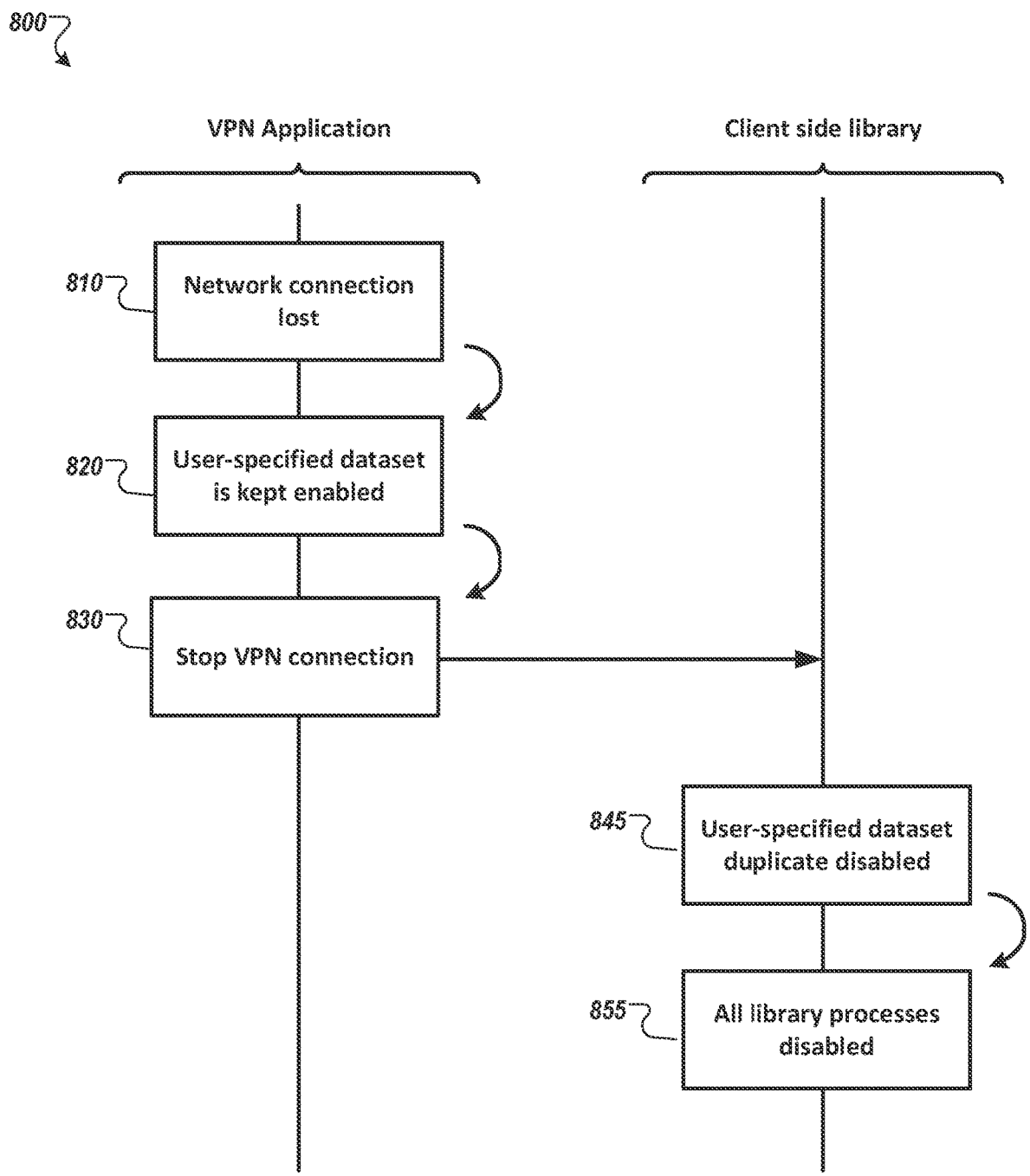
FIG. 8 shows a user-specific dataset flow when the VPN connection is lost.

In cases where VPN connection is lost and not restored 810 (per FIG. 8), the user-specific dataset is kept enabled 820 on the VPN application to prevent a data leak, and the client side library is asked to stop VPN connection 830. The duplicate dataset is disabled 845 on the client side library together with all ongoing library processes 855.

Figure 9:
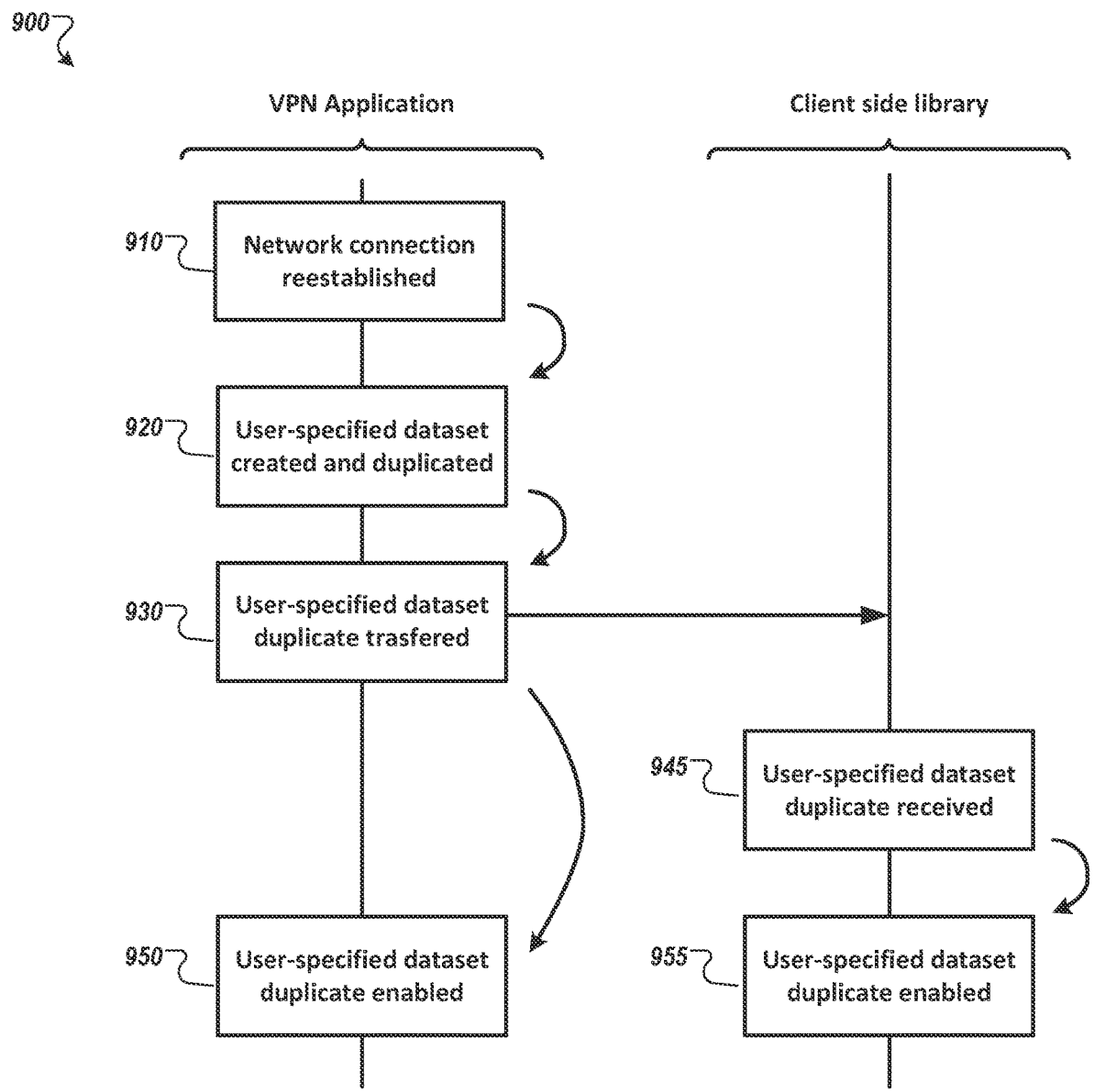
FIG. 9 shows a user-specific dataset flow on re-establishing a VPN connection.

In cases where the network connection is lost and then successfully re-established 910 (per FIG. 9). The user-specific dataset is duplicated 920 on the VPN application and transferred 930 to the client side library where it is received 945 and enabled 955 together with the user-specific dataset on the VPN application 950.

Figure 10:
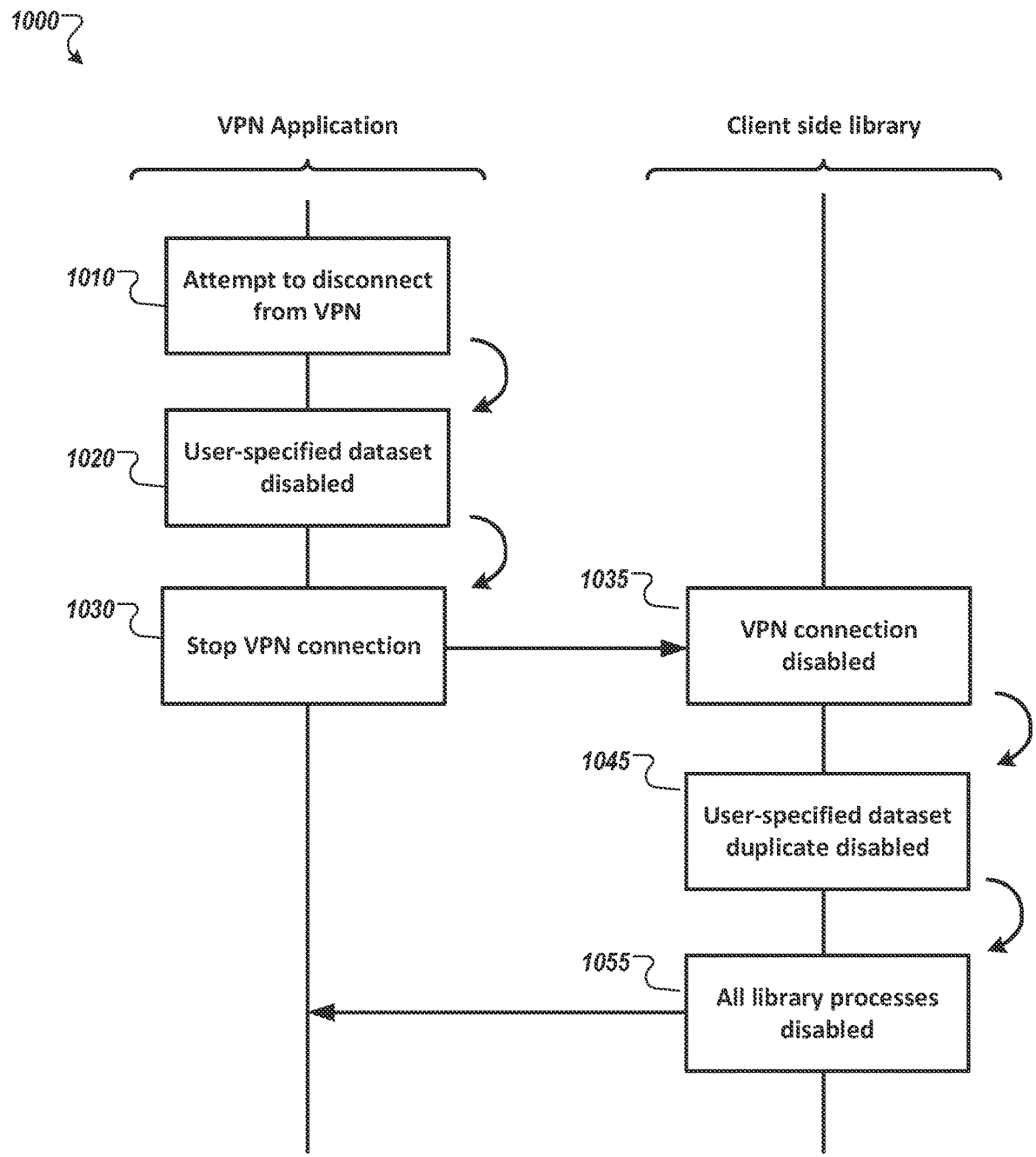
FIG. 10 shows a user-specific dataset flow on disconnecting from a VPN connection.

In cases where the user chooses to initiate a VPN connection termination 1010 (per FIG. 10), the user-specific dataset is disabled 1020, then the VPN connection is disabled on both the VPN application 1030 and client side library 1035. The duplicate user-specific dataset on the client side library is disabled 1045 together with all ongoing library processes 1055.

Figure 11:
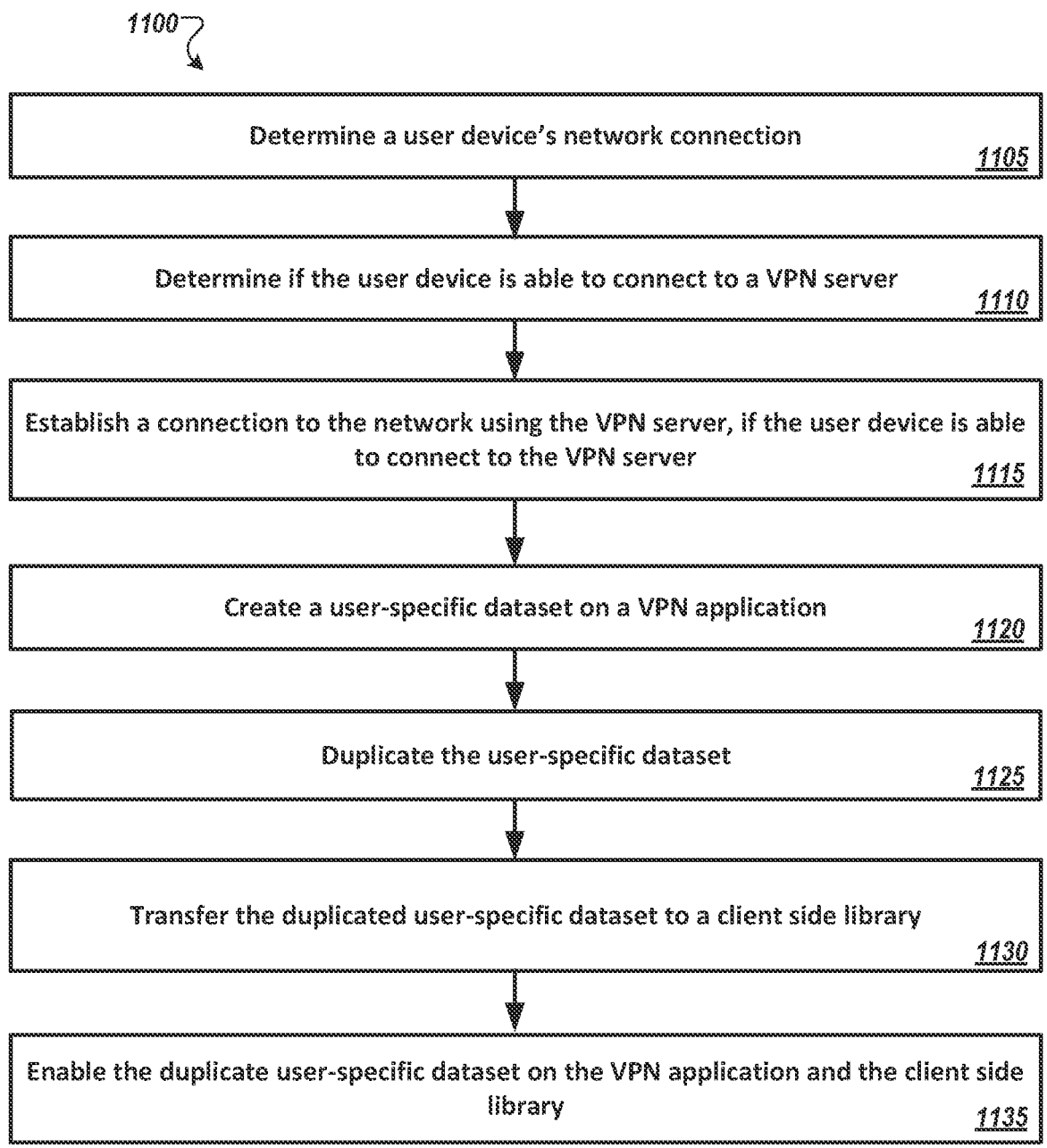
FIG. 11 shows a schematic of an exemplary implementation of the method when a connection to a VPN server is re-established.

In some aspects, the method includes (per FIG. 11) steps of determining the user device's network connection 1105 and determining if the user device is able to connect to a VPN server 1110, which is carried out by the network detection manager 133*a* or as part of the VPN application 132*b*. If the user device is able to connect to the VPN server, the method includes establishing a connection to the network using the VPN server 1115. After connecting to the VPN server and to protect against data leakage, the method includes creating a user-specific dataset on the VPN application 1120, duplicating the user-specific dataset 1125, transferring the duplicated user-specific dataset to a client side library 131*a*, 131*b*, which may act as an API, and enabling the duplicate user-specific dataset on the VPN application and the client side library 1135.

Figure 12:
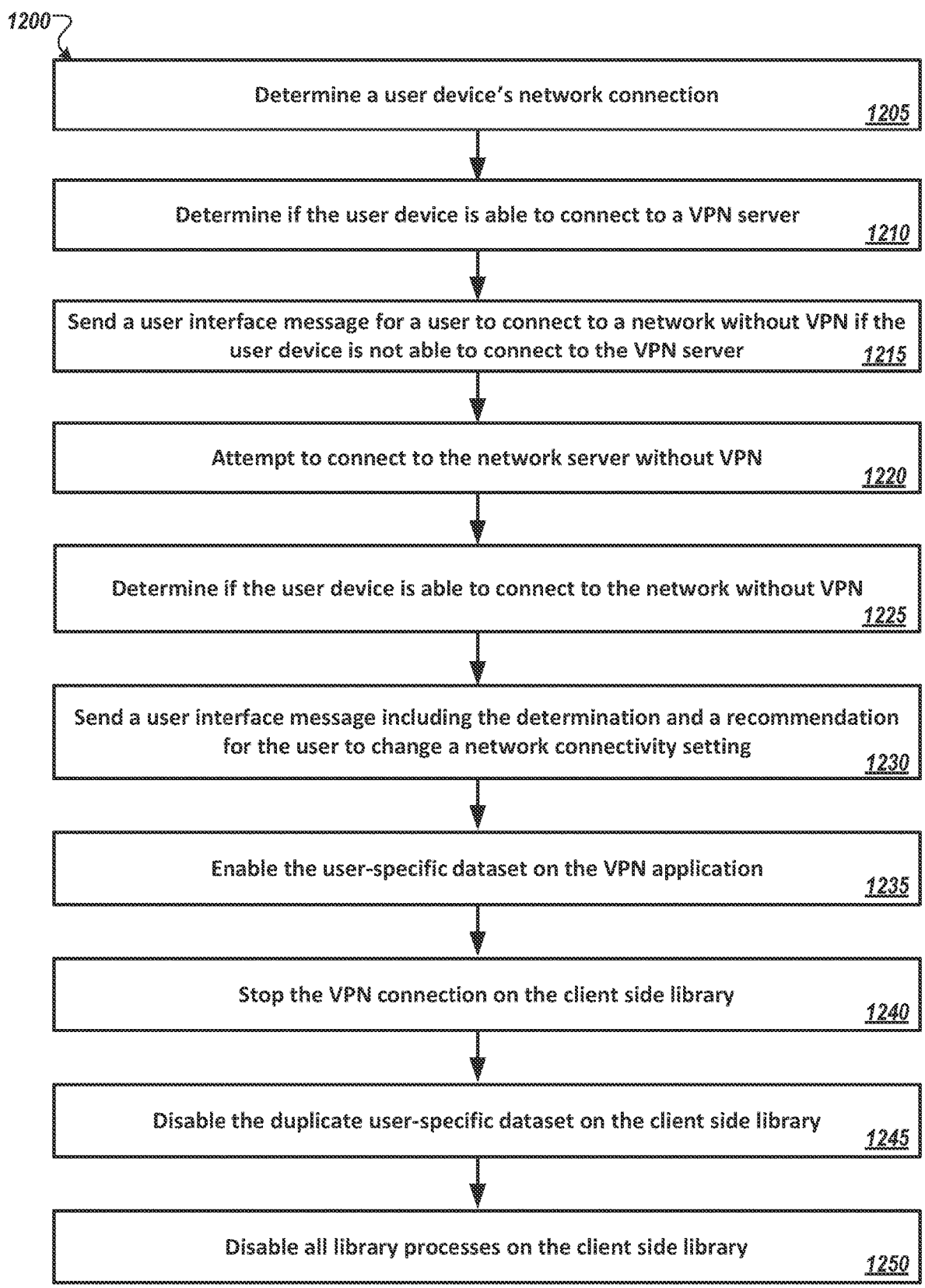
FIG. 12 shows a schematic of an exemplary implementation of the method when a connection to a VPN server is unsuccessful.

In other aspects, the method includes (per FIG. 12) steps of determining the user device's network connection 1205 and determining if the user device is able to connect to a VPN server 1210, which is carried out by the network detection manager 133*a* or as part of the VPN application 132*b*. If the user device is not able to connect to the VPN server, the method includes sending a user interface message for a user to connect to the network without VPN 1215. At the user's initiative, the VPN application attempts to connect to the network without VPN 1220 and determines if the user device is able to connect to the network without VPN 1225. Upon a determination, the method includes sending a UI message including the determination and a recommendation for the user to change a network connectivity setting 1230, which may be a network setting or a VPN application setting; enabling a user-specific dataset on the VPN application 1235; stopping the VPN connection on the client side library 1240; disabling the duplicate user-specific dataset on the client side library 1245; and disabling all library processes on the client side library 1250.

In yet other aspects, if it is determined that the user device is not able to connect to a VPN server, the method includes attempting to connect to each of a plurality of VPN servers by enabling a server rotation strategy, which includes rotating through the plurality of VPN servers and determining if the user device is able to connect to a VPN server. If the user device is able to connect to a VPN server, the method includes attempting to connect to the network using a VPN server; duplicating the user-specific dataset for a second time; transferring the second duplicated user-specific dataset to a client side library; and enabling the second duplicated user-specific dataset on the VPN application and the client side library. If the user device is not able to connect to a VPN server, the method further includes sending a UI message for the user to connect to a network without VPN; attempting to connect to the network without VPN; determining if the user device is able to connect to the network without VPN; and in response to the determination; sending a UI message comprising the determination and a recommendation for the user to change a network connectivity setting; enabling the user-specific dataset on the VPN application; stopping the VPN connection on the client side library; disabling the duplicate user-specific dataset on the client side library; and disabling all library processes on the client side library.

In some aspects, if the user device is not able to connect to a VPN server after employing the server rotation strategy, the method further includes enabling a protocol/feature rotation strategy, which includes: checking a status of VPN features and enabling a plurality of VPN features, wherein the plurality of VPN features comprises a first group of VPN features and a second group of VPN features; disabling the first group of VPN features; attempting to connect to each of a plurality of VPN servers by rotating through the plurality of VPN servers. If the user device is able to connect to a VPN server, the method includes establishing a connection to the network using the VPN server; duplicating the user-specific dataset on the VPN application for a second time; transferring the second duplicated user-specific dataset to a client side library; and enabling the second duplicated user-specific dataset on the VPN application and the client side library.

If the user device is still not able to connect to the VPN server, the method may further include: disabling each VPN feature of the second group of VPN features in turn; rotating through a plurality of VPN protocols; and attempting to connect to the VPN server. If the user device is then able to connect to the VPN server, the method includes establishing a connection to the network using the VPN server; duplicating the user-specific dataset on the VPN application for a second time; transferring the second duplicated user-specific dataset to a client side library; and enabling the second duplicated user-specific dataset on the VPN application and the client side library.

If the user device is not able to connect to the VPN server, the method may further include: sending a UI message for a user to try to connect to a network without VPN; attempting, by the VPN application, to connect to a network without VPN; determining if the user device is able to connect to the network without VPN; and in response to the determination: sending a UI message comprising the determination and a recommendation for the user to change a network connectivity setting; enabling the user-specific dataset on the VPN application; stopping the VPN connection on the client side library; disabling the duplicate user-specific dataset on the client side library; and disabling all library processes on the client side library.

In some aspects, the first group of VPN features is chosen based on predefined user preferences or user-specific data, on feature maturity (version), on performance-based metrics, or based on other metrics that may indicate a high rate of success in connecting to a VPN server after being disabled.

In other aspects, the method may include determining the user device's network connection and determining if the user device is able to connect to a VPN server. If the user device is not able to connect to a VPN server, the method may further include: checking a status of VPN features and enabling a plurality of VPN features; disabling each of the plurality of VPN features in turn; rotating through a plurality of VPN protocols; attempting to connect to the VPN server; determining whether the user device is able to connect to a VPN server. If the user device is able to connect to a VPN server, the method includes establishing a connection to the network using the VPN server; duplicating the user-specific dataset on the VPN application for a second time; transferring the second duplicated user-specific dataset to a client side library; and enabling the second duplicated user-specific dataset on the VPN application and the client side library. If the user device is not able to connect to a VPN server, the method includes sending a UI message for a user to connect to a network without VPN; attempting to connect to a network without VPN; determining if the user device is able to connect to the network without VPN; and in response to the determination: sending a UI message comprising the determination and a recommendation for the user to change a network connectivity setting; enabling the user-specific dataset on the VPN application; stopping the VPN connection on the client side library; disabling the duplicate user-specific dataset on the client side library; and disabling all library processes on the client side library.

In some aspects, the user may request to terminate the VPN connection, in such cases, the method further includes terminating the VPN connection; disabling the user-specific dataset at the VPN application; stopping the VPN connection on the client side library; disabling the duplicated user-specific dataset at the client side library; and disabling all library processes on the client side library so as to prevent data leakage.

Example Retry Flow Strategy 1: No Rotation Strategy

Figure 3:
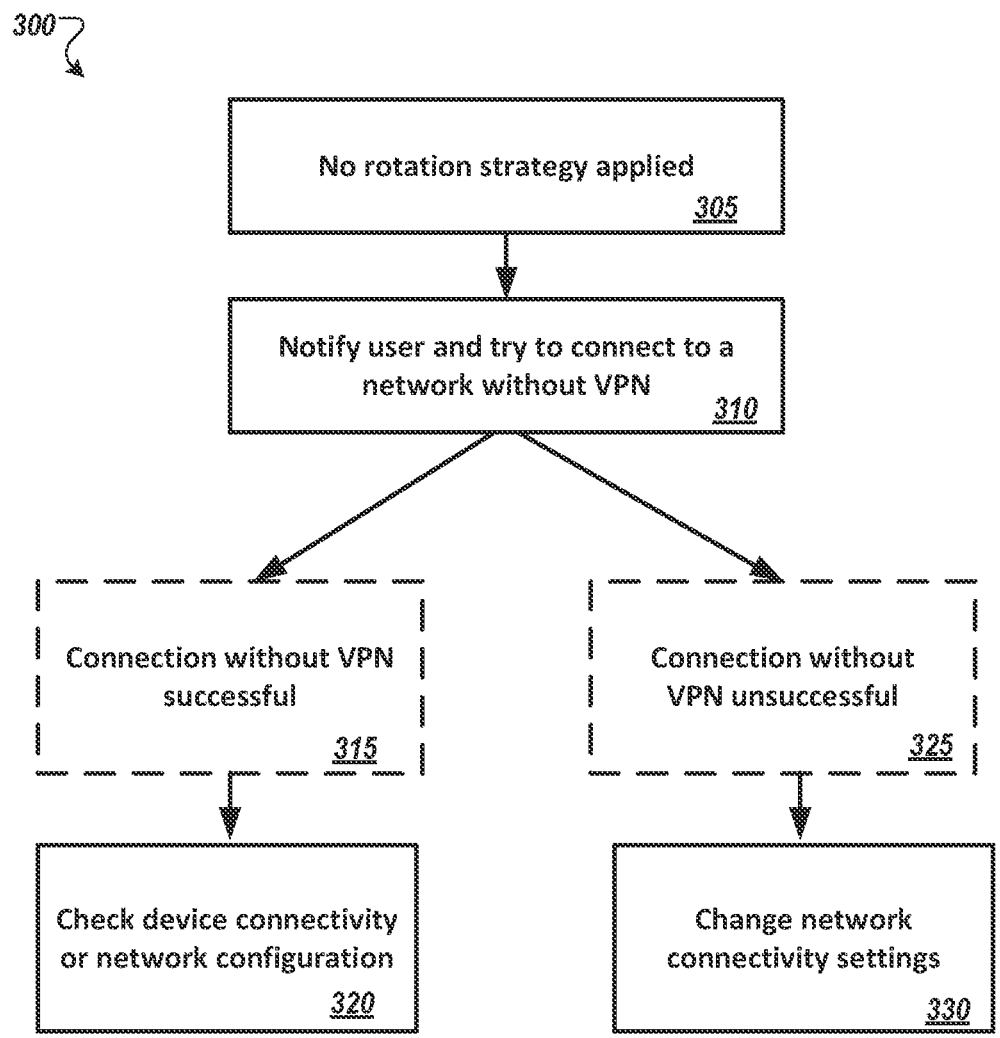
FIG. 3 shows a schematic of an exemplary implementation of the method with no rotation strategy.

In a first example of a retry flow strategy, as shown in FIG. 3, a no rotation strategy is applied. An exemplary method using the no rotation strategy includes enabling a network detection manager, checking a user device's network connectivity status and network identification (ID) by querying external resources (e.g., pinging a user device's OS), monitoring network connectivity by the network detection manager, if the user device is connected to the network, attempting to establish a VPN connection from the user device, if the application cannot connect to a VPN server, enabling the no rotation strategy by the network detection manager, and then the no rotation strategy is applied to restore a VPN connection.

In the no rotation strategy, the user is informed via UI notification if the no rotation strategy is applied 305 and the VPN application attempts to connect to the network without using VPN 310. The user is notified via UI notification if the connection to the network is successful while connecting without VPN 315. In this case, the user is recommended to check the device's connectivity or network configuration via UI notification 320. The user is notified via UI notification if the connection to the network is not restored after connecting without VPN 325, and in that case, the user is suggested to change the network connectivity settings 330 in the notification based on the situation. For example, if the user has selected a manual connection to VPN protocol, a UI message is provided that suggests choosing an automated connection to the most convenient VPN protocol.

After the retry flow strategy is complete, the method further includes determining which user-specific dataset flow is applied and informing the user about the outcome via a UI message with further action list.

Example Retry Flow Strategy 2: Server Rotation Strategy

Figure 4:
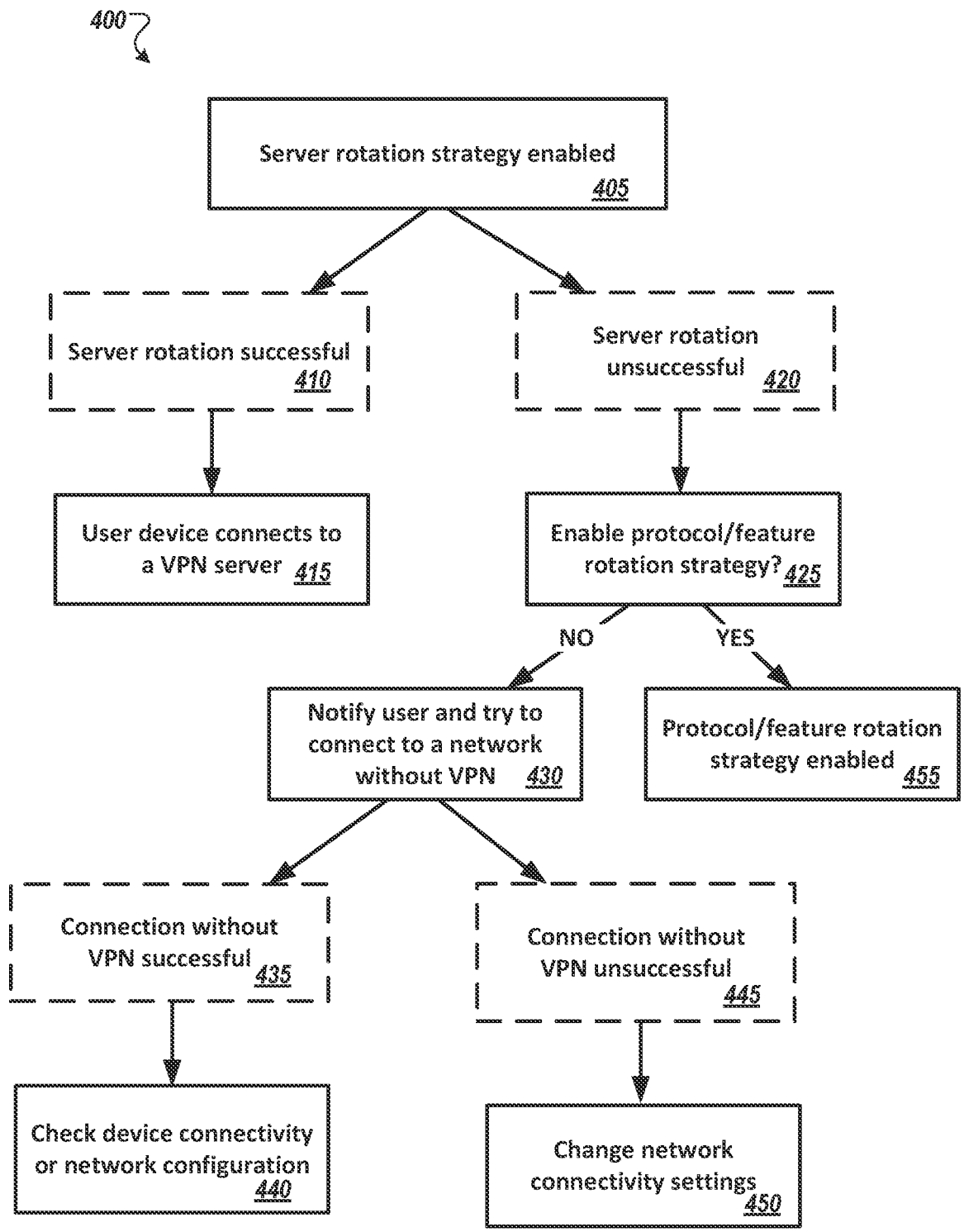
FIG. 4 shows a schematic of an exemplary implementation of the method with server rotation strategy.

In a second example of a retry flow strategy, as shown in FIG. 4, a server rotation strategy is applied. An exemplary method using the server rotation strategy includes enabling a network detection manager, checking a user device's network connectivity status and network identification (ID) by querying external resources (e.g., pinging a user device's OS), attempting to establish a VPN connection from the user device, monitoring network connectivity by the network detection manager, if the user device is connected to the network and the VPN application cannot connect to a VPN server, enabling the server rotation strategy by the network detection manager. The server rotation strategy is applied to restore a VPN server connection.

In the server rotation strategy, the VPN application rotates through available VPN servers and attempts to connect 405, while the optimal VPN server list (rotation list) is constantly updated in the background. If the server rotation is successful 410, the user device is connected to one of the VPN servers from the rotation list 415. If the connection during server rotation is unsuccessful 420, the user is informed about the connection status via a UI dialog message and suggested to enable a different strategy (e.g., the protocol/feature rotation strategy) 425. If the user decides not to enable a different strategy (e.g., the protocol/feature strategy), the user is informed via UI notification that the application will attempt to connect to the network without using VPN 430. If the connection status has changed while connecting without VPN 435, the user is notified about the connection status via UI notification. In the event of such changes, the user is recommended via UI notification to check the device's connectivity or network configuration 440. If the connection to the network is not restored after connecting without VPN 445, the user is suggested to change network connectivity settings 450.

After the retry flow strategy is complete, the method further includes determining which user-specified dataset flow is applied and informing the user about the outcome via a UI message with a list of further actions. The action list may be to continue retry flow strategies or to terminate the VPN connection. If the user chooses to terminate the connection, the user-specified dataset is disabled.

Example Retry Flow Strategy 3: Protocol/Feature Rotation Strategy

Figure 5:
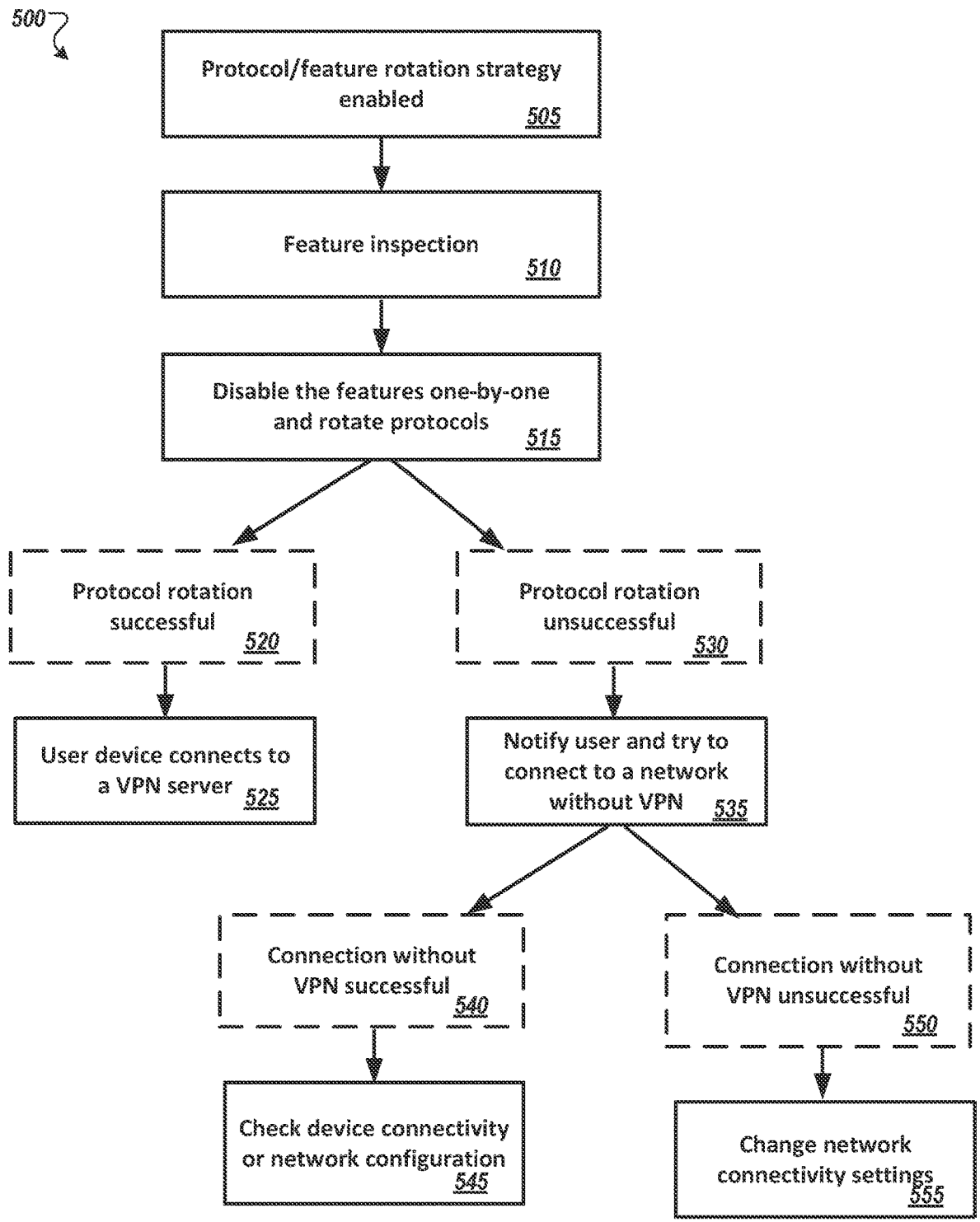
FIG. 5 shows a schematic of an exemplary implementation of the method with VPN protocol/feature rotation strategy.

In a third example of a retry flow strategy, as shown in FIG. 5, a protocol/feature rotation strategy is applied. An exemplary method using the protocol/feature rotation strategy includes enabling a network detection manager, checking a user device's network connectivity status and network ID by querying external resources (e.g., pinging a user device's OS), monitoring network connectivity by the network detection manager, if the user device is connected to the network, the network detection manager attempts to establish a VPN connection from the user device, if the VPN application cannot connect to a VPN server, enabling the protocol/feature rotation strategy by the network detection manager. The protocol/feature rotation strategy is applied to restore a VPN connection.

In the protocol/feature rotation strategy, first, the protocol/feature rotation strategy is enabled 505. The network detection manager inspects the status of VPN features within the VPN application to determine if they are enabled or disabled 510. When a plurality of VPN features is enabled, the network detection manager starts the process then a plurality of VPN features are enabled. In some aspects, the plurality of VPN features are grouped into a first group of VPN features and a second group of VPN features, and the network detection manager starts the process of disabling the first group of VPN features of disabling each of the plurality of VPN features one by one 515 and attempts to connect to the VPN server. In some implementations, specific VPN features are disabled first, in other implementations the VPN features are disabled in random order. If the protocol rotation is successful (e.g. VPN connection is restored) 520, the user device is connected to the VPN server 525, and the protocol/feature rotation strategy stops.

In some implementations, the plurality of VPN features that are enabled are two, three, four, or up to and including the total number of VPN features available. Each of the plurality of features may be disabled in turn. In some implementations the VPN application rotates through the VPN features in random order.

If changing protocols does not lead to a successful connection 530, the user is notified via a UI message that the application will attempt to connect to the network without using VPN 535. If connection status has changed while connecting to the network without VPN 540, the user is notified about the outcome via a UI message. In the event of such changes, the user is provided with appropriate guidance, and the user is recommended to check the device's connectivity or network configuration via UI notification 545. If the connection to the network is not restored 550 after attempting to connect without VPN, the user is notified via a UI message and suggested to change network connectivity settings 555.

After the retry flow strategy is complete, the method further includes determining which user-specified dataset flow is applied, informing the user about the outcome via a UI message with further action list. The action list may be to continue retry flow strategies or to terminate the connection. If the user chooses to terminate the connection, the user-specified dataset is disabled.

Figure 6:
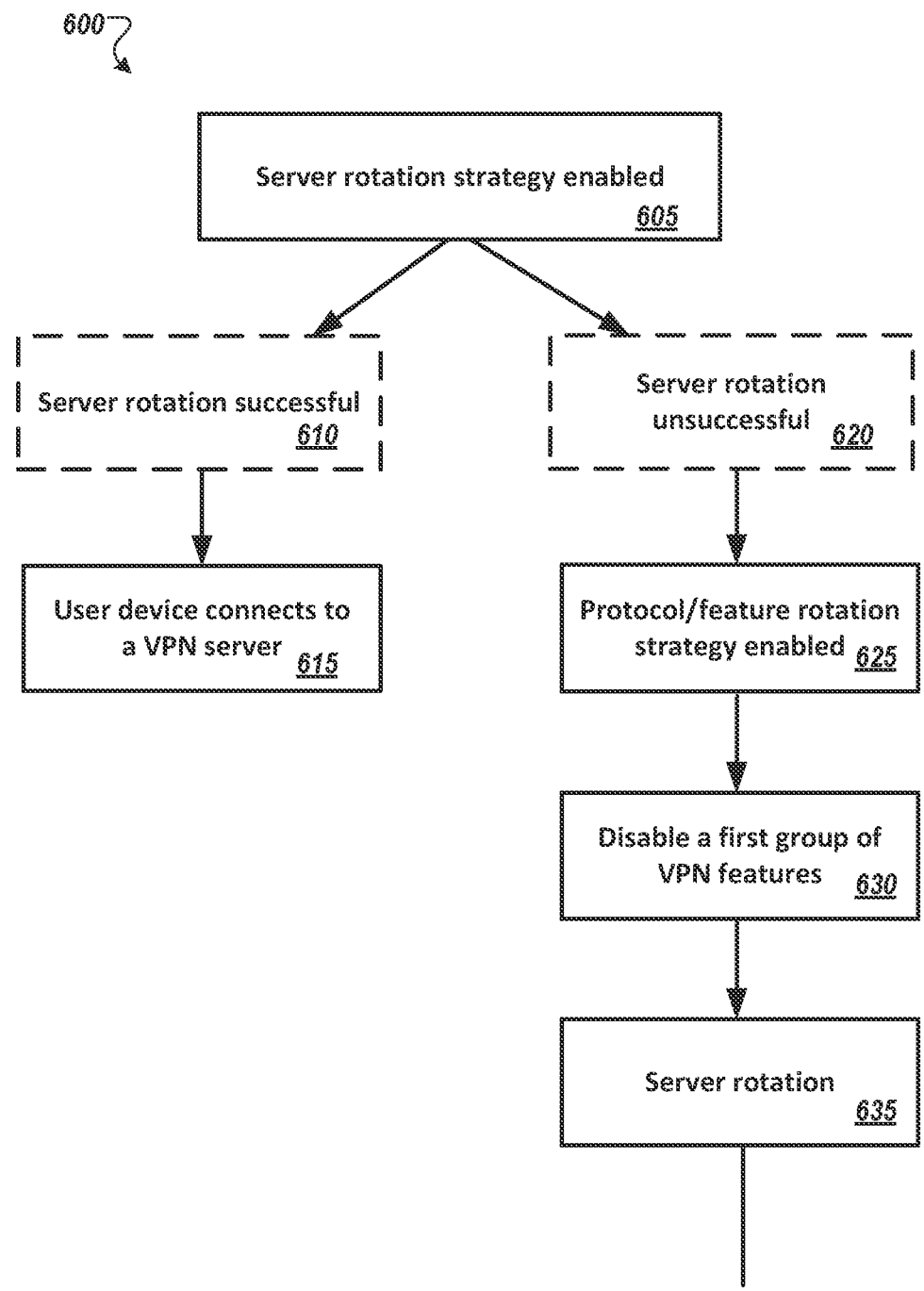
FIG. 6 shows a schematic of an exemplary implementation of the method with combined server rotation and protocol/feature rotation strategies.
Figure 6:
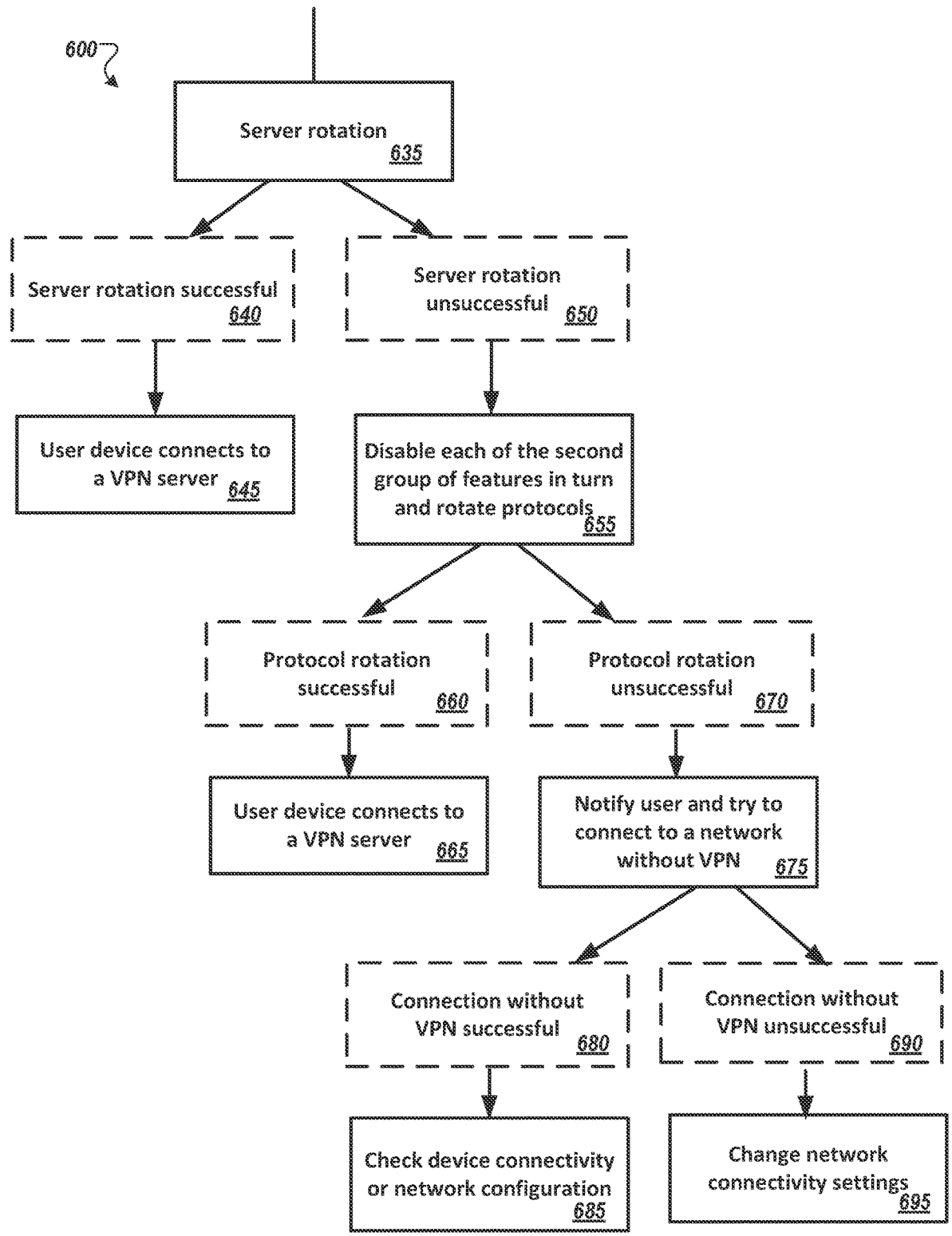

Example Retry Flow Strategy 4: Combined Server Rotation and Protocol/Feature Rotation Strategies In a fourth example of a retry flow strategy, as shown in FIG. 6, the server rotation and protocol/feature rotation strategies are combined. An exemplary method using the server and protocol/feature rotation strategies combined includes enabling a network detection manager, checking a user device's network connectivity status and network ID by querying external resources, attempting to establish a VPN connection from the user device, monitoring network connectivity by the network detection manager, if the user device is connected to the network and the VPN application cannot connect to a VPN server, enabling the combined server rotation and protocol/feature rotation strategies by the network detection manager when the user device is connected to the network and cannot connect to a VPN server. Then the combined server rotation and protocol/feature rotation strategies are applied.

In the combined server rotation and protocol/feature rotation strategies, first, the VPN application rotates through available VPN servers and attempts to connect 605. If the server rotation is successful 610, the user device is connected to one of the VPN servers from the VPN server rotation list 615. If the connection during server rotation is unsuccessful 620, the user is informed via a UI message and suggested to enable the protocol/feature rotation strategy 625. If the user decides to enable the protocol/feature rotation strategy, the method proceeds.

The status of VPN features is inspected within the application to determine if they are enabled or disabled, and then a plurality of VPN features are enabled. In some aspects, the plurality of VPN features are grouped into a first group of VPN features and a second group of VPN features, and the network detection manager starts the process of disabling the first group of VPN features 630 and then the server rotation is performed again 635. If the rotation is successful 640, the user device is connected to one of the VPN servers from the VPN server rotation list 645. If the VPN application is not able to connect to one of the VPN servers 650 after disabling the first group of VPN features, then the second group of VPN features are disabled one-by-one, and the VPN application rotates through all possible VPN protocols in a dedicated order 655. If protocol rotation is successful 660, the user device is connected to a VPN server 665.

In some implementations, the plurality of VPN features that are enabled are two, three, four, or up to and including the total number of VPN features available. Each of the plurality of features in the second group of VPN features may be disabled in turn. In some implementations the VPN application rotates through the VPN features in random order.

If changing protocols does not lead to a successful connection 670, the user is notified about the connection status via a UI message that the VPN application will attempt to connect to the network without using VPN 675. If the connection status has changed while connecting without VPN 680, the user is notified about the outcome via a UI message. In the event of such changes, the user is recommended via UI notification to check the device's connectivity or network configuration 685.

If the connection to the network is not restored after connecting without VPN 690, the user is notified via UI notification and suggested to change network connectivity settings 695.

After the retry flow strategy is complete, the method further includes determining which user-specified dataset flow is applied, informing the user about the outcome via a UI message with further action list. The action list may be to continue retry flow strategies or to terminate the connection.

It is important to note that any retry flow strategy employed by the system and method stores in memory the related data to the protocol that successfully connected the user device to a VPN server during the previous session. Subsequently, this VPN protocol/server is persistently used for subsequent connection attempts. However, there are specific cases in which the selected strategy for the retry flow strategy may be required to reset.

The first case pertains to periodic reevaluation. After a predefined period of time, it is necessary to recheck whether the strategy used for connection remains optimal (i.e., for the user's current location (taking into consideration distance to the target server, distance to the international hub, etc.), user's selected VPN features (taking into consideration the types of features that user enabled). Depending on the timeframe, different retry flow strategies come into play, with increasing predefined periods between checks (e.g., 1 day, 2 days, 4 days or etc.). These checks help ensure that the connection strategy is consistently providing the best performance for the user's needs. Once the predefined period is reached, the system continues to re-initiate the retry flow strategy every predefined period until it identifies a new best connection strategy, at which point the cycle restarts.

The second case necessitating retry flow strategy re-initiation is specific situations where ensuring the user's optimal VPN experience is paramount. These situations trigger a reset of the strategy. In this strategy, the user enables a subset of VPN features, such that the VPN features are compatible only with the specified VPN protocols. The user is prompted to reset the retry flow strategy's best connection strategy.

Another instance of re-initiating the retry flow strategy is after the end of protocol rotation. If the current rotation of connection strategies reaches its end and the selected retry strategy is enabled, the application will reset to ensure that with the next attempts, the user device can rotate through all VPN protocols again. While this reset occurs, there are no resets during the rotation process itself.

In yet another instance, the user may modify the VPN protocol in the user device's connection settings. In such instances, the connection strategy is reset to the user's selection, and the retry flow strategy is disabled.

In another instance, the user may decide to switch from a specific VPN protocol supporting a server group to a group that supports a different VPN protocol. This transition triggers a retry flow to ensure that the user benefits from the fastest available VPN protocol.

Example Computing Environment

The user device 100a is shown (per FIG. 1A) to include a processor 120a and a memory 130a. Processor 120a can be a general-purpose processor, an ASIC, one or more FPGAs, a group of processing components, or other suitable electronic processing structures. In some embodiments, processor 120a is configured to execute program code stored on memory 130a to cause the user device 100a to perform one or more operations, as described below in greater detail.

Memory 130a can include one or more devices (e.g., memory units, memory devices, storage devices, etc.) for storing data and/or computer code for completing and/or facilitating the various processes described in the present disclosure. In some embodiments, memory 130a includes tangible (e.g., non-transitory), computer-readable media that stores code or instructions executable by processor 120a. Tangible, computer-readable media refers to any physical media that is capable of providing data that causes the user device to operate in a particular fashion. Example tangible, computer-readable media may include, but is not limited to, volatile media, non-volatile media, removable media and non-removable media implemented in any method or technology for storage of information such as computer readable instructions, data structures, program modules or other data. Accordingly, memory 130a can include RAM, ROM, hard drive storage, temporary storage, non-volatile memory, flash memory, optical memory, or any other suitable memory for storing software objects and/or computer instructions. Memory 130a can include database components, object code components, script components, or any other type of information structure for supporting the various activities and information structures described in the present disclosure. Memory 130a can be communicably connected to processor 120a, such as via a processing circuit, and can include computer code for executing (e.g., by processor 120a) one or more processes described herein.

While shown as individual components, it will be appreciated that processor 120a and/or memory 130a can be implemented using a variety of different types and quantities of processors and memory. For example, processor 120a may represent a single processing device or multiple processing devices. Similarly, memory 130a may represent a single memory device or multiple memory devices. Additionally, in some embodiments, the user device may be implemented within a single computing device (e.g., one server, one housing, etc.). In other embodiments, the user device may be distributed across multiple servers or computers (e.g., that can exist in distributed locations). For example, the user device may include multiple distributed computing devices (e.g., multiple processors and/or memory devices) in communication with each other that collaborate to perform operations. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. For example, virtualization software may be employed by the user device to provide the functionality of a number of servers that is not directly bound to the number of computers in the user device.

Memory 130a is shown to include a client side library 131a, which may act as an API, and a VPN application 132a. The VPN application 132a includes executable code, that when executed by the processor, causes the processor to perform the method. The VPN application may be in communicable connection with the client side library 131a. A network detection manager 133a, which performs processes related to detecting connection status of the external resource (e.g., pinging a user device's OS)/or VPN application 132a to the network 150 and subsequently the plurality of VPN servers 160, is included in the memory 130a in communication with the VPN application 132a. Alternatively, the VPN application 132b includes the network detection manager 133b.

The user device is also shown to include a communications interface 140a that facilitates communications between the user device and a network 150, including communication via the network 150 to a plurality of VPN servers 160. For example, communications interface 140a can provide means for transmitting data to, or receiving data from, the network 150 and subsequently the plurality of VPN servers 160. Accordingly, communications interface 140a can be or can include a wired or wireless communications interface (e.g., jacks, antennas, transmitters, receivers, transceivers, wire terminals, etc.) for conducting data communications, or a combination of wired and wireless communication interfaces. In some embodiments, communications via communications interface 140a are direct (e.g., local wired or wireless communications) or via a network (e.g., a WAN, the Internet, a cellular network, etc.). For example, communications interface 140a may include one or more Ethernet ports for communicably coupling user device 100a to a network (e.g., the Internet). In another example, communications interface 140a can include a WiFi transceiver for communicating via a wireless communications network. In yet another example, communications interface 140a may include cellular or mobile phone communications transceivers.

The construction and arrangement of the systems and methods as shown in the various exemplary implementations are illustrative only. Although only a few implementations have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied, and the nature or number of discrete elements or positions may be altered or varied. Accordingly, all such modifications are intended to be included within the scope of the present disclosure. The order or sequence of any process or method steps may be varied or re-sequenced according to alternative implementations. Other substitutions, modifications, changes, and omissions may be made in the design, operating conditions, and arrangement of the exemplary implementations without departing from the scope of the present disclosure.

The present disclosure contemplates methods, systems, and program products on any machine-readable media for accomplishing various operations. The implementation of the present disclosure may be implemented using existing computer processors, or by a special purpose computer processor for an appropriate system, incorporated for this or another purpose, or by a hardwired system. Implementations within the scope of the present disclosure include program products including machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures, and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general-purpose computer, special purpose computer, or special purpose processing machines to perform a certain function or group of functions.

Although the figures show a specific order of method steps, the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

It is to be understood that the methods and systems are not limited to specific synthetic methods, specific components, or to particular compositions. It is also to be understood that the terminology used herein is for the purpose of describing particular implementations only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of implementations of the disclosed methods.

What is claimed is:

1. A method for reestablishing a VPN connection of a user device, the method comprising:
   determining a user device's network connection; and
   determining whether the user device is able to connect to a VPN server;
   wherein in response to the determination that the user device is able to connect to a VPN server:
      establishing a connection to the network with the VPN server;
      creating a user-specific dataset on a VPN application;
      duplicating the user-specific dataset;
      transferring the duplicated user-specific dataset to a client side library; and
      enabling the duplicated user-specific dataset on the VPN application and the client side library; and
   wherein in response to the determination that the user device is not able to connect to a VPN server, the method further comprising:
   sending a user interface message for a user to connect to a network without VPN;
   attempting to connect to a network without VPN; and
   determining if the user device is able to connect to the network without VPN;
   wherein in response to the determination:
      sending a user interface message comprising the determination and a recommendation for the user to change a network connectivity setting;
      enabling the user-specific dataset on the VPN application;
      stopping the VPN connection on the client side library;
      disabling the duplicate user-specific dataset on the client side library; and
      disabling all library processes on the client side library.

2. The method of claim 1, wherein in response to the determination that the user device is not able to connect to a VPN server, the method further comprising:
   attempting to connect to each of a plurality of VPN servers by rotating through the plurality of VPN servers; and
   determining, by the VPN application, whether the user device is able to connect to a VPN server;
   wherein in response to the determination that the user device is able to connect to a VPN server:
      establishing a connection to the network using a VPN server;
      duplicating the user-specific dataset on the VPN application for a second time;
      transferring the second duplicated user-specific dataset to a client side library; and
      enabling the second duplicated user-specific dataset on the VPN application and the client side library.

3. The method of claim 2, wherein in response to the determination that the user device is not able to connect to a VPN server, the method further comprising:
   sending a user interface message for a user to connect to a network without VPN;
   attempting to connect to a network without VPN; and
   determining if the user device is able to connect to the network without VPN;
   wherein in response to the determination:
      sending a user interface message comprising the determination and a recommendation for the user to change a network connectivity setting;
      enabling the user-specific dataset on the VPN application;
      stopping the VPN connection on the client side library;
      disabling the duplicate user-specific dataset on the client side library; and
      disabling all library processes on the client side library.

4. The method of claim 2, wherein in response to the determination that the user device is not able to connect to a VPN server, the method further comprising:
   checking a status of VPN features and enabling a plurality of VPN features, wherein the plurality of VPN features comprises a first VPN feature;
   disabling the first VPN feature;
   attempting to connect to each of a plurality of VPN servers by rotating through the plurality of VPN servers; and
   determining, by the VPN application, whether the user device is able to connect to a VPN server;
   wherein in response to the determination that the user device is able to connect to the VPN server:
      establishing a connection to the network using the VPN server;
      duplicating the user-specific dataset on the VPN application for a second time;
      transferring the second duplicated user-specific dataset to a client side library; and
      enabling the second duplicated user-specific dataset on the VPN application and the client side library.

5. The method of claim 4, wherein in response to the determination that the user device is not able to connect to the VPN server, the method further comprising:
   disabling each of the plurality of VPN features in turn;
   rotating through a plurality of VPN protocols;
   attempting to connect to the VPN server; and
   determining, by the VPN application, whether the user device is able to connect to the VPN server;
   wherein in response to the determination that the user device is able to connect to the VPN server:
      establishing a connection to the network using the VPN server;
      duplicating the user-specific dataset on the VPN application for a second time;
      transferring the second duplicated user-specific dataset to a client side library; and
      enabling the second duplicated user-specific dataset on the VPN application and the client side library.

6. The method of claim 5, wherein in response to the determination that the user device is not able to connect to the VPN server, the method further comprising:
   sending a user interface message for a user to try to connect to a network without VPN;
   attempting, by the VPN application, to connect to a network without VPN; and
   determining if the user device is able to connect to the network without VPN;
   wherein in response to the determination:
      sending a user interface message comprising the determination and a recommendation for the user to change a network connectivity setting;
      enabling the user-specific dataset on the VPN application;
      stopping the VPN connection on the client side library;
      disabling the duplicate user-specific dataset on the client side library; and
      disabling all library processes on the client side library.

7. The method of claim 1, wherein in response to the determination that the user device is not able to connect to a VPN server, the method further comprising:
   checking a status of VPN features and enabling a plurality of VPN features;

disabling each of the plurality of VPN features in turn;
rotating through a plurality of VPN protocols;
attempting to connect to the VPN server; and
determining whether the user device is able to connect to a VPN server:
wherein in response to the determination that the user device is able to connect to a VPN server:
   establishing a connection to the network using the VPN server;
   duplicating the user-specific dataset on the VPN application for a second time;
   transferring the second duplicated user-specific dataset to a client side library; and
   enabling the second duplicated user-specific dataset on the VPN application and the client side library.

8. The method of claim 7, wherein in response to the determination that the user device is not able to connect to a VPN server, the method further comprising:
sending a user interface message for a user to connect to a network without VPN;
attempting to connect to a network without VPN; and
determining if the user device is able to connect to the network without VPN;
wherein in response to the determination:
   sending a user interface message comprising the determination and a recommendation for the user to change a network connectivity setting;
   enabling the user-specific dataset on the VPN application;
   stopping the VPN connection on the client side library;
   disabling the duplicate user-specific dataset on the client side library; and
   disabling all library processes on the client side library.

9. The method of claim 1 further comprising:
receiving a user request to terminate the VPN connection;
terminating the VPN connection;
disabling the user-specific dataset at the VPN application;
stopping the VPN connection on the client side library;
disabling the duplicated user-specific dataset at the client side library; and
disabling all library processes on the client side library.

10. A system for reestablishing a VPN connection, the system comprising
a user device comprising:
   a processor;
   a communications interface, wherein the communication interface is in communication with a network and the network communicates with a plurality of VPN servers;
   a non-transitory computer readable medium with computer-executable instructions stored thereon that when executed by the processor, cause the system to:
   check the user device's network connection; and
   determine whether the user device is able to connect to a VPN server;
   wherein in response to the determination that the user device is able to connect to a VPN server:
      establish a connection to the network using the VPN server;
      create a user-specific dataset on a VPN application;
      duplicate the user-specific dataset;
      transfer the duplicated user-specific dataset to a client side library; and
      enable the duplicated user-specific dataset on the VPN application and the client side library; and wherein in response to the determination that the user device is not able to connect to a VPN server:
   send a user interface message for a user to connect to a network without VPN;
   attempt, by the VPN application, to connect to a network without VPN; and
   determine if the user device is able to connect to the network without VPN;
wherein in response to the determination, send a user interface message comprising the determination and a recommendation for the user to change a network connectivity setting.

11. The system of claim 10, further comprising computer-executable instructions that when executed by the processor cause the system to:
wherein in response to the determination that the user device is not able to connect to a VPN server:
   attempt to connect to each of a plurality of VPN servers by rotating through the plurality of VPN servers; and
   determine whether the user device is able to connect to a VPN server;
wherein in response to the determination that the user device is able to connect to a VPN server:
   establish a connection to the network using the VPN server;
   duplicate the user-specific dataset on the VPN application for a second time;
   transfer the second duplicated user-specific dataset to a client side library; and
   enable the second duplicated user-specific dataset on the VPN application and the client side library.

12. The system of claim 11, further comprising computer-executable instructions that when executed by the processor cause the system to:
wherein in response to the determination that the user device is not able to connect to a VPN server:
   send a user interface message for a user to connect to a network without VPN;
   attempt to connect to a network without VPN; and
   determine if the user device is able to connect to the network without VPN;
wherein in response to the determination:
   send a user interface message comprising the determination and a recommendation for the user to change a network connectivity setting;
   enable the user-specific dataset on the VPN application;
   stop the VPN connection on the client side library;
   disable the duplicate user-specific dataset on the client side library; and
   disable all library processes on the client side library.

13. The system of claim 11, further comprising computer-executable instructions that when executed by the processor cause the system to:
wherein in response to the determination that the user device is not able to connect to a VPN server:
   check a status of VPN features and enabling a plurality of VPN features, wherein the plurality of VPN features comprises a first VPN feature;
   disable the first VPN feature;
   attempt to connect to each of a plurality of VPN servers by rotating through the plurality of VPN servers; and
   determine, by the VPN application, whether the user device is able to connect to a VPN server;
wherein in response to the determination that the user device is able to connect to the VPN server:
   establish a connection to the network using the VPN server;

duplicate the user-specific dataset on the VPN application for a second time;
transfer the second duplicated user-specific dataset to a client side library; and
enable the second duplicated user-specific dataset on the VPN application and the client side library.

14. The system of claim 13, further comprising computer-executable instructions that when executed by the processor cause the system to:
wherein in response to the determination that the user device is not able to connect to the VPN server:
disable each of the plurality of VPN features;
rotate through a plurality of VPN protocols;
attempt to connect to the VPN server; and
determine, by the VPN application, whether the user device is able to connect to the VPN server;
wherein in response to the determination that the user device is able to connect to the VPN server:
establish a connection to the network using the VPN server;
duplicate the user-specific dataset on the VPN application for a second time;
transfer the second duplicated user-specific dataset to a client side library; and
enable the second duplicated user-specific dataset on the VPN application and the client side library.

15. The system of claim 14, further comprising computer-executable instructions that when executed by the processor cause the system to:
wherein in response to the determination that the user device is not able to connect to the VPN server:
send a user interface message for a user to try to connect to a network without VPN;
attempt to connect to a network without VPN; and
determine if the user device is able to connect to the network without VPN;
wherein in response to the determination:
send a user interface message comprising the determination and a recommendation for the user to change a network connectivity setting;
enable the user-specific dataset on the VPN application;
stop the VPN connection on the client side library;
disable the duplicate user-specific dataset on the client side library; and
disable all library processes on the client side library.

16. The system of claim 10, further comprising computer-executable instructions that when executed by the processor cause the system to:
wherein in response to the determination that the user device is not able to connect to a VPN server:
check a status of VPN features and enabling a plurality of VPN features:
disable each of the plurality of VPN features in turn;
rotate through a plurality of VPN protocols;
attempt to connect to the VPN server; and
determine whether the user device is able to connect to a VPN server;
wherein in response to the determination that the user device is able to connect to a VPN server:
establish a connection to the network using the VPN server;
duplicate the user-specific dataset on the VPN application for a second time;
transfer the second duplicated user-specific dataset to a client side library; and
enable the second duplicated user-specific dataset on the VPN application and the client side library.

17. The system of claim 16, further comprising computer-executable instructions that when executed by the processor cause the system to:
wherein in response to the determination that the user device is not able to connect to the VPN server:
send a user interface message for a user to try to connect to a network without VPN;
attempt to connect to a network without VPN; and
determine if the user device is able to connect to the network without VPN;
wherein in response to the determination:
send a user interface message comprising the determination and a recommendation for the user to change a network connectivity setting;
enable the user-specific dataset on the VPN application;
stop the VPN connection on the client side library;
disable the duplicate user-specific dataset on the client side library; and
disable all library processes on the client side library.

18. The system of claim 10, further comprising computer-executable instructions that when executed by the processor cause the system to:
receive a user request to terminate the VPN connection:
terminate the VPN connection;
disable the user-specific dataset at the VPN application;
stop the VPN connection on the client side library;
disable the duplicated user-specific dataset at the client side library; and
disable all library processes on the client side library.

* * * * *